United States Patent
Blackburn et al.

(10) Patent No.: US 7,452,611 B2
(45) Date of Patent: *Nov. 18, 2008

(54) PHOTOCHROMIC OPTICAL ARTICLE

(75) Inventors: William P. Blackburn, Safety Harbor, FL (US); Michael B. Levesque, Tampa, FL (US); Kevin W. Seybert, McKeesport, PA (US); Jeanine A. Conklin, Swissvale, PA (US); Nancyanne Gruchacz, Clearwater, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 285 days.

This patent is subject to a terminal disclaimer.

(21) Appl. No.: 10/229,773

(22) Filed: Aug. 28, 2002

(65) Prior Publication Data

US 2003/0165686 A1    Sep. 4, 2003

Related U.S. Application Data

(60) Provisional application No. 60/344,167, filed on Dec. 27, 2001.

(51) Int. Cl.
*B32B 27/08* (2006.01)
*G02C 7/02* (2006.01)

(52) U.S. Cl. .................. 428/500; 428/505; 351/159

(58) Field of Classification Search .......... 428/412, 428/423.1, 411.1, 424.2, 500, 505; 351/159
See application file for complete search history.

(56) References Cited

U.S. PATENT DOCUMENTS

| | | | |
|---|---|---|---|
| 3,361,706 A | 1/1968 | Meriwether et al. ........... 260/39 |
| 3,971,872 A | 7/1976 | LeBoeuf ..................... 428/412 |
| 4,166,043 A | 8/1979 | Uhlmann et al. ............. 252/300 |
| 4,367,170 A | 1/1983 | Uhlmann et al. ............. 252/286 |
| 4,405,679 A | 9/1983 | Fujioka et al. .............. 428/216 |
| 4,720,356 A | 1/1988 | Chu .......................... 252/586 |
| 4,731,264 A | 3/1988 | Lin et al. ................... 427/387 |
| 4,756,973 A | 7/1988 | Sakagami et al. ............ 428/412 |
| 4,873,029 A | 10/1989 | Blum ........................ 264/1.3 |
| 4,904,525 A | 2/1990 | Taniguchi et al. ........... 428/328 |
| 4,931,220 A | 6/1990 | Haynes et al. ............... 252/586 |
| 5,104,692 A | 4/1992 | Belmares .................... 427/164 |
| 5,130,353 A | 7/1992 | Fischer et al. ................. 524/43 |
| 5,134,191 A | 7/1992 | Takarada et al. ............. 524/783 |
| 5,185,390 A | 2/1993 | Fischer et al. ................. 524/43 |
| 5,231,156 A | 7/1993 | Lin .......................... 526/279 |
| 5,391,327 A | 2/1995 | Ligas et al. ................. 252/586 |
| 5,462,866 A | 10/1995 | Wang ........................ 435/174 |
| 5,516,559 A * | 5/1996 | Rockrath et al. ........... 427/407.1 |
| 5,580,819 A | 12/1996 | Li et al. ..................... 427/167 |
| 5,621,017 A | 4/1997 | Kobayakawa et al. ......... 522/16 |
| 5,639,802 A | 6/1997 | Neckers et al. ............... 522/25 |
| 5,645,767 A | 7/1997 | Van Gemert ................ 252/586 |
| 5,658,501 A | 8/1997 | Kumar et al. ............... 252/586 |
| 5,674,941 A * | 10/1997 | Cho et al. ................... 525/102 |
| 5,728,769 A | 3/1998 | Natesh et al. ............... 524/591 |
| 5,770,115 A | 6/1998 | Misura ...................... 252/586 |
| 5,776,376 A | 7/1998 | Nagoh et al. ................ 252/586 |
| 5,910,375 A | 6/1999 | Parker et al. ................ 428/520 |
| 5,916,669 A | 6/1999 | Parker et al. ................ 428/216 |
| 5,962,617 A | 10/1999 | Slagel ........................ 528/61 |
| 6,025,026 A | 2/2000 | Smith et al. ................ 427/316 |
| 6,060,001 A * | 5/2000 | Welch et al. ................ 252/586 |
| 6,084,702 A * | 7/2000 | Byker et al. ................ 359/288 |
| 6,107,395 A | 8/2000 | Rosthauser et al. ......... 524/719 |
| 6,150,430 A | 11/2000 | Walters et al. ................ 522/79 |
| 6,175,450 B1 | 1/2001 | Andreani et al. ............ 359/586 |
| 6,187,444 B1 * | 2/2001 | Bowles et al. ............. 428/423.1 |
| 6,268,055 B1 * | 7/2001 | Walters et al. .............. 428/413 |
| 2004/0207809 A1 * | 10/2004 | Blackburn et al. .......... 351/163 |

FOREIGN PATENT DOCUMENTS

| | | |
|---|---|---|
| EP | 1433814 A1 | 6/2004 |
| JP | 64-30744 | 2/1964 |
| JP | 3-35236 | 2/1991 |
| JP | 3-269507 | 12/1991 |
| WO | WO 96/37573 | 11/1996 |

OTHER PUBLICATIONS

Encyclopedia of Chemical Technology, Kirk-Othmer, Third Edition, vol. 22, pp. 360-377.

* cited by examiner

*Primary Examiner*—Thao T. Tran
(74) *Attorney, Agent, or Firm*—Linda Pingitore; Frank P. Manak; Deborah M. Altman

(57) ABSTRACT

Describes a photochromic plastic article, e.g., an ophthalmic photochromic article, such as a lens, in which the article includes (1) a polymeric substrate, such as a thermoset or thermoplastic substrate, (2) a photochromic polymeric coating appended to at least one surface of the substrate, the photochromic polymeric coating containing a photochromic amount of at least one organic photochromic material, e.g., spirooxazine, naphthopyran and/or fulgide, and (3) a radiation-cured, acrylate-based film coherently appended to the photochromic coating, the acrylate-based film being (a) resistant to removal by aqueous solutions of inorganic caustic, e.g., potassium hydroxide, (b) compatible with organo silane-containing abrasion-resistant coating, and (c) harder than said photochromic coating. Describes also the aforedescribed photochromic article having an abrasion-resistant coating affixed to the radiation-cured acrylate-based film, e.g., an abrasion-resistant coating comprising an organo silane; and a photochromic article having an antireflective coating affixed to the abrasion-resistant coating.

23 Claims, No Drawings

PHOTOCHROMIC OPTICAL ARTICLE

This application claims priority to provisional application Ser. No. 60/344,167, filed Dec. 27, 2001.

DESCRIPTION OF THE INVENTION

The present invention relates to photochromic articles comprising an organic substrate, e.g., plastic substrates used for optical applications. In particular, the present invention relates to photochromic articles used for ophthalmic applications, e.g., lenses. More particularly, the present invention relates to photochromic articles comprising a transparent polymeric substrate having a transparent photochromic organic polymeric coating appended to at least one surface of the substrate, and a transparent, radiation-cured, acrylate-based thin film appended to said photochromic coating. In accordance with the present invention, the radiation-cured acrylate-based film is resistant to aqueous inorganic caustic, adheres firmly to the photochromic polymeric coating, is compatible with abrasion-resistant, organo silane-containing coatings that may be applied to its exposed surface, and is itself scratch resistant relative to the photochromic coating. Still more particularly, the present invention relates to photochromic articles, such as an ophthalmic plastic lens, on at least one surface of which has been appended sequentially, a first layer of a transparent, preferably optically clear, photochromic polymeric coating and a second layer of the above-described transparent, radiation-cured, acrylate-based film. In a further embodiment of the present invention, there is contemplated photochromic articles having a third layer comprising at least one abrasion-resistant coating that is applied to the second layer. In a still further embodiment, a fourth layer, e.g., an antireflective coating, is applied to the abrasion-resistant coating third layer. Additional layers may be applied to the fourth layer to provide additional functional or protective layers.

Clear plastic ophthalmic articles that provide good imaging qualities while reducing the transmission of incident light into the eye are needed for a variety of applications, such as sunglasses, fashion lenses, non-prescription and prescription lenses, sport masks, face shields and goggles. Responsive to that need, photochromic plastic articles used for optical applications have been given considerable attention. In particular, photochromic ophthalmic plastic lenses have been of interest because of the weight advantage they offer, vis-á-vis, glass lenses.

Photochromism is a phenomenon involving a reversible change in color of an organic or inorganic material, e.g., a chromene or silver halide salt, or an article comprising such a material, upon exposure to ultraviolet radiation. Sources of radiation that contain ultraviolet rays include, for example, sunlight and the light of a mercury lamp. When the photochromic material is exposed to ultraviolet radiation, it exhibits a change in color, and when the ultraviolet radiation is discontinued, the photochromic material returns to its original color or colorless state. Ophthalmic articles that have photochromic material(s) applied to or incorporated within the article exhibit this reversible change in color and a consequent reversible change in light transmission.

The mechanism believed to be responsible for the reversible change in color, i.e., the change in the absorption spectrum in the electromagnetic spectrum of visible light (400-700 nm), that is characteristic of different types of organic photochromic compounds has been described. See, for example, John C. Crano, "Chromogenic Materials (Photochromic)", Kirk-Othmer Encyclopedia of Chemical Technology, fourth Edition, 1993, pp. 321-332. The mechanism responsible for the reversible change in color for organic photochromic compounds, such as indolino spiropyrans and indolino spirooxazines, is believed to involve an electrocyclic mechanism. When exposed to activating ultraviolet radiation, these organic photochromic compounds transform from a colorless closed ring form into a colored open ring form. In contrast, the electrocyclic mechanism responsible for the reversible change in color of photochromic fulgide compounds is believed to involve a transformation from a colorless open ring form into a colored closed ring form.

Photochromic plastic articles have been prepared by incorporating the photochromic material into the plastic substrate by surface imbibition techniques. See, for example, U.S. Pat. Nos. 5,130,353 and 5,185,390, which describe the inclusion of photochromic dyes into the subsurface region of a plastic article, such as a lens, by first applying one or more photochromic dyes/compounds to the surface of the plastic article, either as the neat photochromic dye/compound or dissolved in a polymeric or other organic solvent carrier, and then applying heat to the coated surface to cause the photochromic dye/compound(s) to diffuse into the subsurface region of the lens (a process commonly referred to as "imbibition"). The plastic substrates of such photochromic plastic articles are believed to have sufficient free volume within the polymer matrix to allow photochromic compounds, such as the aforementioned spirooxazines, spiropyrans and fulgides, to transform from the colorless form into the colored form, and then revert to their original colorless form. There are, however, certain polymer matrices that are not believed to have sufficient free volume to allow the aforedescribed electrocyclic mechanism to occur sufficiently to permit their use as a substrate for imbibed (or internally incorporated) photochromic materials for commercially acceptable photochromic applications. Such substrates include, for example, thermoset polymer matrices, such as those prepared from polyol (allyl carbonate) monomers such as allyl diglycol carbonate monomers, e.g., diethylene glycol bis(allyl carbonate), and copolymers thereof, the commonly known thermoplastic bisphenol A-based polycarbonates, and highly cross-linked optical polymers.

To allow the use of thermoset polymers, thermoplastic polycarbonates, and highly cross-linked optical polymeric materials as plastic substrates for photochromic articles, it has been proposed to apply organic photochromic coatings to the surface of such plastic substrates. See, for example, U.S. Pat. No. 6,187,444 B1, which describes the application of a photochromic polyurethane coating to a plastic substrate. It has also been proposed to apply an abrasion-resistant coating onto the exposed surface of the photochromic coating to protect the surface of the photochromic coating from scratches and other similar cosmetic defects resulting from physical handling, cleaning and exposure of the photochromic coating to the environment. See, for example, U.S. Pat. No. 6,268,055 B1.

In certain circumstances involving ophthalmic plastic lenses having a photochromic polymeric coating and an overlay of an abrasion-resistant coating, it has been observed that when such lenses are severely scratched, cleaning of such a scratched lens with commercially available cleaning solutions containing alcohol, e.g., isopropyl alcohol, may cause imperfections in the photochromic coating. In addition, it is not uncommon to find that an abrasion-resistant coating that is applied to the photochromic coating, or an antireflective coating that is applied to the abrasion-resistant coating, fails to pass product requirements, or in the case of ophthalmic lenses does not meet commercially acceptable "cosmetic standards" for ophthalmic lenses. Cosmetic defects in a coated lens can include spots, scratches, inclusions, cracks and crazing. When this occurs, it is economically desirable to remove the defective coating, e.g., by chemical treatment with an aqueous caustic solution, and thereafter to apply a new coating. In the process of chemically removing the unacceptable coating, the underlying coatings, e.g., the photochromic coating, can be damaged, thereby destroying the value of the article, e.g., the lens. As is readily evident to those skilled in the art, sequential application of the abrasion-resistant and the antireflective coatings to the photochromic coating of an ophthalmic lens is one of the last in a series of multiple manufacturing steps, each of which adds value and increases the cost of the lens being produced. To scrap the lens at this near final stage of the production process because an appended coating fails to meet product requirements increases production costs and increases the final cost of the lens product. Avoidance of such product losses is, therefore, economically desirable.

Further, some manufacturers of photochromic ophthalmic lenses desire to place their own proprietary abrasion-resistant and/or antireflective coatings on the photochromic coated lenses that have been prepared by another manufacturer. It is possible for the photochromic coating to become scratched or blemished as a consequence of packaging, shipment, unpacking, cleaning or other physical handling of the lens in preparation for the application of such abrasion-resistant and/or antireflective coatings. Consequently, it is desirable that a lens that is shipped to such manufacturers be resistant to scratches or other cosmetic imperfections that may be caused during packaging, unpacking, shipment, cleaning and/or handling of the photochromic coated lens, i.e., be scratch resistant.

It has now been discovered that providing an appropriate organic film between the photochromic polymeric coating and the abrasion-resistant coating can substantially attenuate the problems described above. More particularly, it has been discovered that such problems can be substantially attenuated by applying a radiation-cured acrylate-based thin film to the photochromic coating, which acrylate film adheres to the photochromic coating, is scratch resistant relative to the photochromic coating, is resistant to removal as a result of treatment with aqueous inorganic caustic, and is compatible with abrasion-resistant coatings comprising an organo silane material.

In accordance with one embodiment of the present invention, there is contemplated a photochromic article, e.g., a lens, comprising, in combination:

(a) a transparent organic polymeric substrate;

(b) an organic polymeric coating appended to at least a portion of at least one surface of said polymeric substrate, said polymeric coating comprising at least one organic photochromic material; and (c) radiation-cured, acrylate-based film appended coherently to said photochromic polymeric coating, the exposed surface of said radiation-cured acrylate film being:

(1) resistant to treatment with aqueous inorganic caustic, (2) compatible with organo silane-containing abrasion resistant coating, and (3) scratch resistant.

In another embodiment of the present invention, there is contemplated the above-described transparent photochromic article further comprising an abrasion-resistant coating, such as a hard coating comprising an organo silane, appended to the exposed surface of the radiation-cured acrylate-based film. In this embodiment, it has been discovered that there is a measurable increase in the abrasion resistance of the abrasion-resistant coating, as measured by the steel wool or Bayer abrasion tests, which tests are described subsequently in this disclosure, compared to placing such a coating directly over the photochromic coating. In a further embodiment of the present invention, there is contemplated a photochromic article that has an antireflective coating applied to the abrasion-resistant coating. Other coatings, such as antistatic and/or antiwetting coatings can also be applied to the antireflective coating.

In a still further embodiment of the present invention, there is contemplated an ophthalmic photochromic article comprising, in combination:

(a) a transparent organic plastic substrate, such as a thermoset substrate prepared from a polymerizable composition comprising an allyl diglycol carbonate, such as diethylene glycol bis(allyl carbonate), a substrate prepared from thermoplastic polycarbonate, a substrate prepared from a polyurea urethane, or a substrate prepared from compositions comprising the reaction product of polyfunctional isocyanate(s) and polythiols or polyepisulfide monomer(s);

(b) an optically clear organic polymeric photochromic coating, such as an acrylic-based, polyurethane-based or polyepoxy-based photochromic coating, appended to at least one surface of said plastic substrate, said polymeric photochromic coating comprising a photochromic amount of at least one organic photochromic material;

(c) optically clear, radiation-cured acrylate-based film adhered coherently to said photochromic coating; and (d) optionally an abrasion resistant coating, such as an organo silane-containing hard coat, adhered to said acrylate-based film, the surface of said radiation-cured acrylate-based film being (1) resistant to removal as a result of treatment with dilute aqueous inorganic caustic solutions, such as alkali metal hydroxide solutions, (2) compatible with organo silane-containing abrasion-resistant coating, and more scratch resistant than the photochromic polymeric coating, i.e., harder than the photochromic polymeric coating. In yet a further contemplated embodiment, an antireflective coating is adhered to said abrasion-resistant coating, assuming that the abrasion-resistant coating is present.

As noted, application of abrasion-resistant coating(s) to a photochromic polymeric coating, which is affixed to a plastic substrate, has been described. See, for example, U.S. Pat. Nos. 6,187,444 B1 and 6,268,055 B1. U.S. Pat. No. 4,405,679 describes a shaped article of a polycarbonate-type resin having a primer coating that adheres to the polycarbonate surface and a subsequent coating of a silicon-type resin. U.S. Pat. No. 4,756,973 describes a lens member of an organic resin and a photochromic layer applied on at least one side of the lens member, which photochromic layer may contain a phenol resin and/or a phenolic compound. The photochromic compound used in the photochromic layer is a spirooxazine compound of a specified formula. Placing a hard coat layer on the surface of the photochromic layer is also described in the '973 patent.

U.S. Pat. No. 5,910,375 describes tintable, scratch resistant coatings for plastic ophthalmic lenses. The '375 patent describes a dual coating that includes a dye reservoir layer that is formed over the surface of the material to be tinted and a hard coating layer that is formed over the dye reservoir layer. U.S. Pat. No. 5,916,669 describes an abrasion resistant article of (1) a plastic substrate, (2) an abrasion enhancement layer that includes an acrylated oligomer or acrylated oligomer/acrylate monomer blend resin deposited on a surface of the plastic substrate, and (3) a top coating layer that includes a polyacrylated urethane, which is deposited on the abrasion enhancement layer.

WO 97/22894 describes a laminated optical article of a front or back wafer of an optical lens, an inner layer of a polymeric film having desirable optical properties, such as properties provided by light polarizing materials, ultraviolet inhibitors, photochromic materials and other pigments and dyes, and an outer layer that forms a protective coating for the inner layer. Japanese Patent Application HEI 3[1991]-269507 describes a plastic lens of a plastic base material, a photochromic primer layer consisting of a thermosetting polyurethane, and a hard coat layer consisting of a silicone resin covering the primer layer. Japanese Patent Applications HEI 3[1991]-35236 and SHO 64[1989]-30744 describe a laminated photochromic article composed of a plastic base material and a sequence of coatings that are: a film of an organic polymer that contains a photochromic compound, a hard coating film, an antireflective film layer(s) having antistatic characteristics, and a water repellent organic film.

DETAILED DESCRIPTION OF THE INVENTION

In accordance with the present invention, there are provided photochromic articles comprising, in combination, a polymeric substrate; a photochromic polymeric coating affixed to at least one surface of the substrate; and a radiation-cured, acrylate-based film adhered to the photochromic coating, the acrylate-based film being (a) scratch resistant, (b) resistant to treatment with dilute aqueous inorganic caustic solutions, and (c) compatible with abrasion-resistant, organo silane-containing coatings. In a further embodiment of the present invention, an abrasion resistant coating, e.g., an organo silane hard coating, is applied to the radiation-cured acrylate-based film. In a still further contemplated embodiment, additional coatings are applied to the abrasion resistant coating. Such additional coatings can include, but are not limited to, antireflective coatings, antistatic coatings, water repellant coatings and combinations of such coatings.

Other than in the operating examples, or where otherwise indicated, all values and ranges of values, such as those expressing refractive indices, wavelengths, quantities of components, recited ranges of various described ingredients, or reaction conditions, used in this description and the accompanying claims are to be understood as modified in all instances by the term "about".

Polymeric organic substrates that may be used in preparing the photochromic articles of the present invention, are any known (or later discovered) plastic materials that are chemically compatible with a photochromic polymeric coating applied to the surface of the substrate. Particularly contemplated are the art-recognized polymers that are useful as optical substrates, e.g., organic optical resins that are used to prepare optically clear castings for optical applications, such as ophthalmic lenses.

Non limiting examples of organic substrates that may be used as polymeric organic substrates are polymers, i.e., homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are incorporated herein by reference. Such organic substrates can be thermoplastic or thermoset polymeric substrates, e.g., transparent, preferably optically clear, substrates having a refractive index that preferably ranges from 1.48 to 1.74, e.g., 1.50 to 1.67.

Examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The exact nature of the organic substrate is not critical to the present invention. However, the organic polymeric substrate should be chemically compatible with the photochromic polymeric coating applied to the surface of the substrate. For optical applications, the substrate should be transparent, preferably optically clear.

The polymeric organic substrate used to prepare the photochromic articles of the present invention may have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such articles is the Gentex polycarbonate lens (available from Gentex Optics) that is sold with a hard coat already applied to the polycarbonate surface. As used in this disclosure and claims, the terms "polymeric organic substrate" (or claims of similar import) or "surface" of such a substrate, is intended to mean and include either the polymeric organic substrate itself or such a substrate with a coating on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating, on the surface of the substrate. Hence, the term "substrate" includes substrates having a coating on its surface. The coating can be any suitable coating and is not limited to an abrasion-resistant coating (hard coat), e.g., any protective coating or coating to provide additional functional properties to the article of which the substrate is a part.

The use of photochromic organic coatings on plastic substrates, particularly plastic substrates such as thermoplastic polycarbonates, has been described. In accordance with the present invention, any organic polymeric material that can be used as a coating with the chosen organic substrate and which will function as a host material for the organic photochromic materials/compounds selected for use can be used. Preferably, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed. Otherwise, the precise chemical nature of the organic coating that is used as the host material for the photochromic material(s) is not critical.

Non-limiting examples of such organic polymeric materials include polyurethane-based coatings, such as those described in U.S. Pat. Nos. 6,107,395 and 6,187,444 B1, and International Publication WO 01/55269; epoxy resin-based coatings, such as those described in U.S. Pat. No. 6,268,055 B1; acrylic/methacrylic monomer-based coatings, such as those described in International Patent Publication WO 01/02449 A3 (U.S. patent application Ser. No. 09/345,028, filed Jul. 2, 1999), which is entitled, "Poly(Meth)Acrylic Photochromic Coating"; International Patent Publications WO 96/37593 and WO 97/06944, and U.S. Pat. Nos. 5,621, 017 and 5,776,376; aminoplast, e.g., melamine type, resins, such as those described in International Patent Publication WO 00/36048 (U.S. patent application Ser. No. 09/449,099, filed Nov. 24, 1999), which is entitled "Aminoplast Resin Photochromic Coating Composition and Photochromic Articles"; coatings comprising hydroxyl-functional components and polymeric anhydride-functional components, i.e., polyanhydride coatings, such as those described in International Patent Publication WO 00/34410 (U.S. patent application Ser. No., 09/209,731, filed Dec. 11, 1998), which is entitled "Polyanhydride Photochromic Coating Composition and Photochromic Articles"; and coatings comprising N-alkoxymethyl(meth)acrylamide functional polymers, such as those described in U.S. patent application Ser. No. 09/211, 249, filed Dec. 14, 1998, now U.S. Pat. No. 6,060,001, which is entitled "Alkoxyacrylamide Photochromic Coating Composition and Photochromic Articles". The disclosures of each of the aforedescribed patents and patent applications respecting polymeric photochromic coatings are incorporated herein by reference.

Of particular interest are photochromic polyurethane-based coatings, photochromic polyacrylic or polymethacrylic-based coatings [referred to collectively as poly (meth)acrylic-based coatings], and photochromic epoxy resin-based coatings. Of special interest are the optically clear photochromic polyurethane, epoxy and poly(meth)acrylic-based coatings for use on transparent, e.g., optically clear, plastic substrates for ophthalmic applications, such as plano and vision correcting lenses, sun lenses and goggles, commercial and residential windows, automotive and aircraft transparencies, helmets, plastic sheeting, clear films, etc. The term "transparent", as used in this disclosure and claims in connection with a substrate, film or coating, is intended to mean that the indicated coating, film or material, such as the plastic substrate, the non-activated photochromic coating, the radiation-cured acrylate-based film, and coatings superimposed or superposed on the radiation-cured acrylate-based film, have a light transmission of at least 70%, preferably at least 80%, and more preferably at least 85%. By the term "optically clear", as used in this disclosure and claims, is meant that the specified item has a light transmission that satisfies commercially accepted and regulatory values for optical, e.g., ophthalmic, articles.

Polyurethanes that may be used to prepare a photochromic polyurethane coating are those produced by the reaction of an organic polyol component and an isocyanate component, as more fully described in column 3, line 4 through column 6, line 22 of U.S. Pat. No. 6,187,444 B1, which disclosure is incorporated herein by reference. More particularly, the polyurethanes are produced from a combination of at least one hard segment producing organic polyol and at least one soft segment producing organic polyol. Generally, the hard segment results from the reaction of the isocyanate and a chain extender, i.e., a short chain polyol such as low molecular weight diols and triols; and the soft segment results from the reaction of the isocyanate with a polymer backbone component such as a polycarbonate polyol, a polyester polyol or a polyether polyol, or mixtures of such polyols. The weight ratio of hard segment producing polyols to soft segment-producing polyols can vary from 10:90 to 90:10.

The relative amounts of the components comprising the polyurethane reaction mixture may be expressed as a ratio of the available number of reactive isocyanate groups to the available number of reactive hydroxyl groups, e.g., a ratio of NCO:OH groups of from 0.3:1.0 to 3.0:1.0.

The isocyanate component can be an aliphatic, aromatic, cycloaliphatic or heterocyclic isocyanate, or mixtures of such isocyanates. Typically, the isocyanate component is selected from blocked or unblocked aliphatic or cycloaliphatic isocyanates, or mixtures of such isocyanates.

As further described in U.S. Pat. No. 6,107,395, the disclosure of which has been incorporated herein by reference, polyurethanes suitable as photochromic host material can be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

The previously mentioned International Patent Publication WO 01/02449 A3 describes reaction mixtures for poly(meth) acrylic host materials for photochromic materials as comprising at least two difunctional (meth)acrylate monomers, which may have from greater than 3 to less than 15 alkoxy units. In one embodiment, a difunctional (meth)acrylate has the reactive acrylate groups connected by a straight or branched chain alkylene group, which usually contains from 1 to 8 carbon atoms; while a second difunctional (meth)acrylate has the reactive acrylate groups connected by ethylene oxide, propylene oxide, butylene oxide or mixtures of such oxide groups in random or block order. Such disclosure is incorporated herein by reference.

Epoxy resin-based coatings described in U.S. Pat. No. 6,268,055 B1 are those prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol. Such disclosure is incorporated herein by reference.

The level of photochromic coating applied to at least one surface of the plastic substrate is an amount that is sufficient to provide a sufficient quantity of organic photochromic material, which produces a coating that exhibits a desired change in optical density (ΔOD) when the cured coating is exposed to ultraviolet (UV) radiation, i.e., a photochromic amount. Preferably, the change in optical density measured at 22° C. (72° F.) after 30 seconds of UV exposure is at least 0.05, preferably at least 0.15, and more preferably at least 0.20. The change in optical density after 15 minutes of UV exposure is preferably at least 0.10, preferably at least 0.50, and more preferably at least 0.70.

The bleach rate of the photochromic coating, as reported in terms of the fading half-life (T ½), is preferably not more than 500 seconds, preferably not more than 190 seconds, and more preferably not more than 115 seconds. The half-life bleach rate is the time interval in seconds for the change in optical density (ΔOD) of the activated form of the photochromic coating to reach one half the highest ΔOD after removal of the source of activating light. The aforedescribed values for change in optical density and bleach rate are measured at 22° C. (72° F.).

Stated differently, the amount of active photochromic material used in the photochromic coating may range from 0.5 to 40.0 weight percent, based on the total weight of monomer(s)/resin(s) used to produce the coating. The relative amounts of photochromic material(s) used will vary and depend in part upon the relative intensities of the color of the activated form of the photochromic compound(s), the ultimate color desired, and the solubility or dispersibility of the photochromic material(s) in the polymeric coating. Care should be taken to avoid use of amounts of photochromic material, which cause crystals of the photochromic material (s) to be formed within the coating. Preferably, the concentration of active photochromic material(s) within the photochromic coating ranges from 1.0 to 30 weight percent, more preferably, from 3 to 20 weight percent, and most preferably, from 3 to 10 weight percent (based on the total weight of monomer(s) used to produce the coating.) The amount of photochromic material in the coating may range between any combinations of these values, inclusive of the recited values.

The photochromic coating applied to the surface of the plastic substrate will typically have a thickness of at least 3 microns, preferably at least 5 microns, more preferably, at least 10 microns, e.g., 20 or 30 microns. The applied photochromic coating will also usually have a thickness of not more than 200 microns, preferably not more than 100 microns, and most preferably not more than 50 microns, e.g., 40 microns. The thickness of the photochromic coating may range between any combinations of these values, inclusive of the recited values. For example, the photochromic coating may range from 10 to 50 microns, e.g., 20 to 40 microns. Preferably the applied photochromic coating is free of cosmetic defects, such as scratches, pits, spots, cracks, inclusions, etc.

Typically, the term "coating" is considered by those knowledgeable in the coating art to be a layer having a thickness of not more than 4 mils (about 100 microns). However, as used in this specification and claims in relation to the photochromic coating, the term coating is defined herein as having a thickness such as a thickness defined hereinabove. Further, as used in this specification and claims, it is intended that the term "surface of the polymeric substrate" or like terms, i.e., the surface to which the photochromic polymeric coating is applied, include the embodiment in which only at least a portion of the surface of the substrate is coated. Hence, the photochromic coating (and the acrylate-based film applied to the photochromic coating) may cover only a portion of a surface of the substrate, but typically it is applied to the entire surface of at least one surface.

The hardness of the photochromic coating is not critical, but after application and curing, should preferably be hard enough to be physically/mechanically handled without causing blemishes, e.g., scratches, in the coating. The hardness of the photochromic coating preferably is less than the radiation-cured acrylate-based film applied to the photochromic coating, which in turn is preferably softer than the abrasion-resistant (hard coat) coating applied to the radiation-cured acrylate-based film. Thus, the principal coatings applied to the plastic substrate (not including any primer layer that may be applied to the substrate) increase in hardness in the direction of the abrasion-resistant coating. This gradient in hardness for the foregoing coatings/film can be quantified by performing the Bayer Abrasion Test (described hereinafter) on each of the coatings. The values obtained by the Bayer Abrasion Test are a ratio (Bayer haze gain ratio), which indicates the relative amount of haze developed in the coating compared to a standard. The hardness gradient will be evidenced by an increasing Bayer ratio starting with the inner photochromic coating and ending with the outer abrasion resistant coating, the Bayer ratio of the acrylate-based film being intermediate to the Bayer ratio of the photochromic coating and the abrasion-resistant coating.

The Fischer microhardness of organic photochromic coatings has been described in the published patent literature as typically being at least 40 or 50 Newtons per $mm^2$, preferably at least 60 or 70 Newtons per $mm^2$, and as typically less than 150 Newtons per $mm^2$, preferably less than 130, more preferably less than 120, e.g., 100, Newtons per $mm^2$. In accordance with the present invention, the Fischer microhardness of the photochromic coating may be lower than 40, e.g., 15, and can be in the lower portion of the ranges described above, e.g., from 15 to 80. This lower range of hardness allows the electrocyclic mechanism discussed previously in relation to photochromic materials to occur with greater efficiency than at higher hardness values, and results in lower bleach rate values for the photochromic materials compared to bleach rates observed with photochromic coatings of higher hardness values. The Fischer microhardness of photochromic coatings may range between any combinations of the stated values, inclusive of the recited values. Fischer microhardness values are measured with a Fischerscope HCV Model H-100 (available from Fischer Technology, Inc.) by taking 3 measurements in the center area of the test sample under conditions of a 100 milliNewton load, 30 load steps, and 0.5 second pauses between load steps at an indentor (Vickers diamond stylus) depth of 2 μm (microns).

Photochromic materials, e.g., dyes/compounds or compositions containing such dye/compounds, that can be utilized for the photochromic coating applied to the plastic substrate are organic photochromic compounds and/or substances containing such organic photochromic compounds. The particular photochromic material(s), e.g., compound(s), selected is not critical, and its/their selection will depend on the ultimate application and the color or hue desired for that application. When two or more photochromic compounds are used in combination, they are generally chosen to complement one another to produce a desired color or hue. Organic photochromic compounds used in the photochromic coating commonly have at least one activated absorption maxima within the visible spectrum of between 400 and 700 nanometers. The organic photochromic material(s) is incorporated, e.g., dissolved or dispersed, in the photochromic coating, and color when activated, i.e., when exposed to ultraviolet radiation, the photochromic material(s) changes to the color or hue that is characteristic of the colored form of such material(s).

In one contemplated embodiment, the organic photochromic component of the photochromic coating comprises:

(a) at least one photochromic organic compound having a visible lambda max of from 400 to less than 550, e.g., from 400 to 525, nanometers; and (b) at least one photochromic organic compound having a visible lambda max of greater than 525 or 550 nanometers, e.g., from 525 or 550 to 700 nanometers.

Non-limiting examples of photochromic compounds that may be used in the photochromic coating include benzopyrans, naphthopyrans, e.g., naphtho[1,2-b]pyrans, naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767, benzoxazines, naphthoxazines, and spiro(indoline)pyridobenzoxazines. Specific examples include the naphthopyrans described in U.S. Pat. No. 5,658,501, and the complementary organic photochromic substances disclosed in that patent from column 11, line 57 through column 13, line 36. Other photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; and mixtures of any of the aforementioned photochromic materials/compounds.

In addition, it is contemplated that organic photochromic materials such as photochromic pigments and photochromic compounds encapsulated in metal oxides may be used in the photochromic coating. See, for example, the materials described in U.S. Pat. Nos. 4,166,043 and 4,367,170. The disclosures relating to photochromic compounds and materials in the aforedescribed patents are incorporated herein, in toto, by reference.

The photochromic coating of the present invention may contain one photochromic compound or a mixture of two or more photochromic compounds, as desired. Mixtures of photochromic compounds may be used to attain certain activated colors such as a near neutral gray or near neutral brown. See, for example, U.S. Pat. No. 5,645,767, column 12, line 66 to column 13, line 19, the disclosure of which is incorporated herein by reference, which describes the parameters that define neutral gray and brown colors.

The photochromic compound(s) described herein may be incorporated into the curable coating composition by addition to the coating composition and/or by dissolving it in a solvent before adding it to the curable coating composition. Alternatively, although less preferred, the photochromic compound(s) may be incorporated into the cured polymer coating by imbibition, permeation, diffusion or other transfer methods, which methods are known to those skilled in the art of dye transfer into host materials.

In addition to photochromic materials, the photochromic coating (or precursor formulation) may contain additional conventional adjuvants that impart desired properties or characteristics to the coating, or which are required by the process used to apply and cure the photochromic coating on the surface of the plastic substrate, or which enhance the performance of the coating. Such adjuvants include, but are not limited to, light stabilizers, heat stabilizers, rheology control agents, leveling agents, e.g., surfactants, free radical scavengers and adhesion promoting agents, such as trialkoxy silanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate.

Adjuvant materials that may be incorporated into the photochromic coating to enhance the performance of the photochromic material include, but are not limited to, ultraviolet light absorbers, light stabilizers, such as hindered amine light stabilizers (HALS), asymmetric diaryloxalamide (oxanilide) compounds, singlet oxygen quenchers, e.g., a nickel ion complex with an organic ligand, antioxidants, e.g., polyphenolic antioxidants and mixtures of such photochromic performance enhancing adjuvant materials. See, for example, the materials described in U.S. Pat. Nos. 4,720,356, 5,391,327 and 5,770,115, the disclosures of which are incorporated herein by reference.

Compatible (chemically and color-wise) tints, i.e., dyes, may be added to the coating formulation or applied to the plastic substrate for medical reasons or for reasons of fashion, e.g., to achieve a more aesthetic result. The particular dye selected may vary and will depend on the aforesaid need and result to be achieved. In one embodiment, the dye may be selected to complement the color resulting from the activated photochromic materials used, e.g., to achieve a more neutral color or absorb a particular wavelength or incident light. In another contemplated embodiment, the dye may be selected to provide a desired hue to the substrate and/or coating when the photochromic coating is in an unactivated state.

The photochromic coating may be applied to the surface of the plastic substrate as a polymerizable formulation and then cured (polymerized) by methods well known to those skilled in the art including, but not limited to, photopolymerization, thermal polymerization, infrared polymerization, and other sources of radiation. Such application methods include the art-recognized methods of spin coating, curtain coating, dip coating, spray coating or by methods used in preparing overlays. Such methods are described in U.S. Pat. No. 4,873,029, which disclosure is incorporated herein by reference.

When applied as a polymerizable formulation, the photochromic coating formulation will also typically contain from 0 to 10 weight percent, e.g., from 0.01 to 8 weight percent, preferably from 0.1 to 5 weight percent, based on the total weight of the polymerizable monomer(s) in the formulation, of at least one catalyst and/or polymerization initiator, including photoinitiators. The amount of catalyst/initiator may range between any combinations of the aforestated values, inclusive of the recited values. The catalyst(s)/initiator(s) will be selected from those materials that can be used to polymerize the particular monomer(s) used to produce the polymeric coating chosen as the photochromic host, and that will not be significantly detrimental to the photochromic materials that may be included in the coating formulation. The amount of catalyst/polymerization initiator(s) used to polymerize the polymerizable components of the photochromic coating formulation may vary and will depend on the particular initiator and the polymerizable monomers used. Typically, only that amount that is required to initiate (catalyze) and sustain the polymerization reaction is required, i.e., an initiating or catalytic amount.

For example, catalysts that may be used to cure polyurethane reaction mixtures may be selected from the group consisting of Lewis bases, Lewis acids and insertion catalysts described in Ullmann's Encyclopedia of Industrial Chemistry, 5$^{th}$ Edition, 1992, Volume A21, pp. 673 to 674. Usually the catalyst is an organo tin catalyst, e.g., tin octylate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Mixtures of tin catalysts can be used. Other tin catalysts described in the art may be used as well.

Epoxy resin coating compositions typically contain a polyacid curing agent having a high average acid functionality, i.e., two or more acid groups per molecule. Preferably, the acid group is a carboxylic acid group. Examples of polycarboxylic acids include dicarboxylic acids such as oxalic, malonic, succinic, tartaric, glutaric, adipic, sebacic, maleic, fumaric, phthalic, isophthalic, terephthalic, and dodecanedioc acids; tricarboxylic acids such as citric acid; and tetracarboxylic acids such as 1,2,3,4-butane tetracarboxylic acid.

Polyanhydride coating compositions typically contain an amine compound as the curing catalyst. Examples of amine compounds include dimethyl cocoamine, dimethyl dodecylamine, triethylamine, triethanolamine and phenolic compounds containing at least two dialklyamino groups. Aminoplast resin and alkoxyacrylamide polymer coating compositions commonly contain an acidic material as a catalyst. Examples include phosphoric acid or substituted phosphoric acids, such as alkyl acid phosphate and phenyl acid phosphate; and sulfonic acids or substituted sulfonic acids, such as para-toluene sulfonic acid, dodecylbenzene sulfonic acid and dinonylnaphthalene sulfonic acid.

Acrylic/methacrylic monomer-based coating compositions may contain thermal initiators, e.g., initiators that produce free radicals, such as organic peroxy compounds or azobis(organonitrile) compounds, photoinitiators or mixtures of such initiators.

Examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators. Preferred thermal initiators are those that do not discolor the resulting coating or decompose the photochromic material incorporated within the polymerizable coating composition.

Photopolymerization is performed in the presence of at least one photoinitiator using ultraviolet light and/or visible light. Photoinitiators, which are free radical initiators, are classified in two major groups based upon their mode of action. Cleavage-type photoinitiators include acetophenones, α-aminoalkylphenones, benzoin ethers, benzoyl oximes, acylphosphine oxides and bisacylphosphine oxides. Abstraction-type photoinitiators include benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation may still occur via hydrogen abstraction from monomers, oligomers or other components of the system.

Examples of photopolymerization initiators which may be used include benzil, benzoin, benzoin methyl ether, benzoin isobutyl ether, benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, such as 2,6-dimethyl benzoyldiphenyl phosphine oxide, 2,4,6-trimethylbenzoyldiphenyl phosphine oxide, 2,6-dichlorobenzoyldiphenyl phosphine oxide, and 2,6-dimethoxybenzoyldiphenyl phosphine oxide, bisacylphosphine oxides, such as bis(2,6-dimethyoxybenzoyl)-2,4,4-trimethylepentyl phosphine oxide, bis(2,6-dimethylbenzoyl)-2,4,4-trimethylpentyl phosphine oxide, bis (2,4,6-trimethylbenzoyl)-2,4,4-trimethylpentyl phosphine oxide, and bis(2,6-dichlorobenzoyl)-2,4,4-trimethylpentyl phosphine oxide, phenyl4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures thereof.

The source of radiation used for the photopolymerization is preferably selected from those sources that emit ultraviolet light and/or visible light. The source of radiation may be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The photochromic coating may also be cured using an electron beam process that does not require the presence of a thermal or photoinitiator.

Solvents may also be present in the coating formulation in order to dissolve and/or disperse the components of the coating formulation. Typically, a solvating amount of solvent is used, i.e., an amount which is sufficient to solubilize/disperse the solid components in the coating formulation. Commonly, from 10 to 80 weight percent of solvent material, based on the total weight of the coating formulation, is used.

Suitable solvents include, but are not limited to, benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl)pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and di-alkyl ethers of ethylene glycol and their derivatives, which are sold as CELLOSOLVE industrial solvents, and mixtures of such solvents.

In a further contemplated embodiment, the photochromic polymeric coating can be applied as a water-borne coating, i.e., as aqueous polymer dispersion, e.g., as a latex, with or without the presence of an organic solvent. This type of system is a two-phase system comprising an aqueous phase and an organic phase, which is dispersed in the aqueous phase. Use of water-borne coatings is well known in the art. See, for example, U.S. Pat. No. 5,728,769, which relates to aqueous urethane resins and coatings prepared from such resins, and the patents referred to in the '769 patent.

After the photochromic coating formulation is applied to the surface of the plastic substrate, it is cured (polymerized)

by the application of heat (in the case of a thermal cure), and/or ultraviolet or electron beam radiation. The specific cure conditions used will depend on the plastic substrate, the polymerizable components in the formulation and the type of catalyst/initiator used, or in the case of electron beam radiation, the intensity of the electron beam. Thermal curing may involve heating from room temperature up to temperatures below which the plastic substrate is not damaged due to such heating. Temperatures up to 200° C. have been reported. Such cure conditions are well known in the art. For example, a typical thermal cure cycle involves heating the formulation from room temperature (22° C.) to from 85 to 125° C. over a period of from 2 to 20 minutes. The time required for ultraviolet or electron beam radiation cures is generally shorter than a thermal cure, e.g., from 5 seconds to 5 minutes, and will depend on the intensity (power) of the radiation. When the thermal or UV/electron beam cure conditions produce a coating that can be physically handled but is not completely cured, an additional thermal post cure step may also be employed to fully cure the photochromic coating.

Prior to applying the photochromic coating to the surface of the plastic substrate, it is common to clean and treat the surface of the substrate to provide a clean surface and a surface that will enhance adhesion of the photochromic coating to the substrate. Effective treatments include ultrasonic washing, cleaning with an aqueous mixture of organic solvent, e.g., a 50:50 mixture of isopropanol:water or ethanol:water, UV treatment, activated gas treatment, e.g., treatment with low temperature plasma or corona discharge, and chemical treatment that results in hydroxylation of the substrate surface, i.e., etching of the surface with an aqueous solution of alkali metal hydroxide, e.g., sodium or potassium hydroxide, which solution may also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials. All of such described disclosures are incorporated herein by reference.

In some cases, a primer coating is applied to the plastic surface substrate before application of the photochromic coating. The primer coating is interposed between the organic substrate and the photochromic polymeric coating, and serves as a barrier coating to prevent interaction of the polymeric coating components with the substrate and vice versa, and/or as an adhesive layer to promote adhesion of the photochromic coating to the plastic substrate. The primer may be applied to the plastic substrate by any of the methods used to apply the photochromic coating, e.g., spray, spin, spread, curtain, roll or dip coating; and may be applied to a cleaned and untreated or cleaned and treated, e.g., chemically treated, surface of the substrate. Primer coatings are well known to those skilled in the art. Selection of an appropriate primer coating will depend on the plastic substrate used and the particular photochromic coating, i.e., the primer coating must be chemically and physically compatible with the surface of the plastic substrate and the photochromic coating, while providing the functional benefits desired for the primer coating, i.e., barrier and adhesive properties.

The primer coating may be one or several monomolecular layers thick, and can range from 0.1 to 10 microns, more usually from 0.1 to 2 or 3 microns. The thickness of the primer can vary between any combination of the aforementioned values, inclusive of the recited values. One contemplated embodiment of a suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430, which disclosure is incorporated herein by reference.

A further example of a primer coating is described in U.S. Pat. No. 6,025,026, which describes a composition that is substantially free of organosiloxanes and which comprises organic anhydrides having at least one ethylenic linkage and an isocyanate-containing material. Such disclosure is incorporated also herein by reference.

In accordance with the present invention, a radiation-cured, acrylate-based film is appended to the photochromic polymeric coating. The acrylate-based film should be transparent, e.g., optically clear, when used for ophthalmic applications, so as not to interfere with the photochromic function, should adhere firmly to the photochromic coating, be resistant to removal by aqueous inorganic caustic, e.g., alkali metal hydroxide, be scratch resistant relative to the photochromic coating, and be compatible with abrasion resistant coatings containing organo silane(s). The acrylate-based film may consist of a single layer or film, or comprise two or more layers/films of the same or different compositions.

The acrylate-based film can be prepared using acrylic or methacrylic monomers or a mixture of acrylic and/or methacrylic monomers (hereinafter referred to collectively as (meth)acrylic monomers). The mixture of (meth)acrylic monomers can include mono-, di-, tri-, tetra-, and penta-acrylic functional monomers. Additional co-polymerizable monomers, such as epoxy monomers, e.g., monomers containing an epoxy functionality, monomers containing both acrylic and epoxy functionalities, etc., may also be present in the formulation used to prepare the acrylate-based film, as described subsequently herein. The monomers used to prepare the acrylate-based film are comprised of a plurality, e.g., a major amount, i.e., more than 50 weight percent, of acrylic-functional monomers; hence the designation "acrylate-based film". The formulations used to prepare the acrylate-based film may also contain components having at least one isocyanate functionality, e.g., organic monoisocyanates and organic diisocyanates, thereby to incorporate polyurethane groups into the film. The acrylate-based film used in the present invention should possess the physical properties described above; namely, be transparent, adhere to the photochromic coating, be resistant to removal by aqueous alkali metal hydroxide, be compatible with an abrasion-resistant coating comprising organo silane that is applied to its surface, and be more scratch resistant than the photochromic coating, e.g., be harder than the photochromic coating. One skilled in the art can readily determine if the acrylate-based film meets these physical requirements by following the standard test protocols described in the examples and in this description.

Prior to applying the acrylate-based film to the photochromic coating, it is common to treat the surface of the photochromic coating to enhance adhesion of the acrylate-based film to the photochromic coating. Effective treatments include activated gas treatment, such as treatment with a low temperature plasma or corona discharge. A particularly desirable surface treatment is a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. Oxygen is used preferably as the plasma gas because it is believed that it provides a slight, but effective, physical roughening of the surface along with a slight, but effective, chemical modification of the surface. Naturally, the extent of the surface roughening and/or chemical modification will be a function of the conditions of the plasma used, the plasma gas and the operating conditions of the plasma (including the length of time of the treatment).

It is believed that a conventional plasma treatment alters the top 20 to 200 angstroms of the surface (a few molecular layers.) The operating conditions of the plasma unit are a function of the design, size, e.g., volume of the plasma chamber, power and construction of the plasma unit. The frequency at which the plasma operates can vary, e.g., from a low frequency such as 40 kHz to microwave frequencies such as 2.45 GHz. Similarly, the power at which the plasma unit operates can vary, e.g., from 50 to 1000 Watts, e.g., 50 to 750, such as 50 to 150 Watts. The pressure at which the plasma unit operates can also vary; however, it has been observed that low pressures are generally less destructive physically of the treated surface, which is preferred. Low pressures, e.g., from 20 to 65 or 70 Pa are thought to be useful. The time that the surface is exposed to the plasma may also vary and will be a function of the type of surface being treated, e.g., the type of polymer used for the photochromic polymeric coating. However, care should be taken that the surface is not treated for too long since lengthy periods of treatment can be counterproductive. One skilled in the art can readily determine the minimum time required to provide a plasma treated surface that enhances adhesion of the acrylate-based film. For ophthalmic articles, such as lenses, the length of the plasma treatment will generally vary from 1 to 10 minutes, e.g., 1 to 5 minutes.

The surface of the article subjected to plasma treatment will typically be at room temperature; however, if desired the surface can be preheated slightly. However, it should be noted that plasma treatment will tend to increase the temperature of the surface (and article) treated. Consequently, the temperature of the surface during treatment will be a direct function of the period of plasma treatment. The temperature of the surface to be subjected to a plasma treatment should be maintained at temperatures below that at which the surface is not significantly adversely affected (other than the intended increase in surface area by roughening and slight chemical modification.) One skilled in the art can readily select the operating conditions of the plasma unit, vis-á-vis, the plastic substrate treated, to achieve an improvement in the adhesion of a superimposed film/coating on the plasma treated surface. Examination of the treated surface can be performed by atomic force microscopy to determine the relative extent of the physical change in the surface. Generally, a low temperature, microwave frequency, oxygen plasma can be used for treatment of a photochromic coating to which a radiation-cured acrylate-based film is applied.

As used herein, the terms "acrylic" and "acrylate" are used interchangeably and include derivatives of acrylic acids, as well as substituted acrylic acids such as methacrylic acid, ethacrylic acid, etc., unless clearly indicated otherwise. The terms "(meth)acrylic" or "(meth)acrylate" are intended to cover both the acrylic/acrylate and methacrylic/methacrylate forms of the indicated material, e.g., monomer. Since, the acrylate-based film is interposed between the photochromic coating and the abrasion-resistant coating, it serves to tie together these coatings and serves as a barrier to protect the photochromic coating. For simplicity, the acrylate-based film will hereinafter be referred to as either the ABF, AB film or tie layer.

Radiation curing of acrylate-based polymeric systems may utilize electron beam curing (EB) or ultraviolet light (UV) radiation. UV curing requires the presence of at least one photoinitiator (examples of which are disclosed elsewhere in this disclosure), whereas curing by EB techniques does not require a photoinitiator. With the exception of the presence or absence of the photoinitiator, the acrylate-based formulations, which are cured by either UV or EB radiation technology, may otherwise be identical.

Radiation-curable acrylate-based polymeric systems are well known in the polymeric art and any such system may be used to produce the AB film of the present invention, provided that the resultant film satisfies the physical requirements for that film, which are described elsewhere in this specification. A contemplated embodiment of the curable composition for the AB film comprises a combination or miscible blend of one or more free-radical initiated acrylate monomers and/or acrylate oligomers, and one or more cationic initiated epoxy monomers. When this blend of monomers is cured, a polymerizate comprising an interpenetrating network of polymer components is produced.

Examples of acrylate monomers include polyfunctional acrylates, e.g., di-, tri-, tetra-, and penta-functional acrylates, and monofunctional acrylates, e.g., a monomer containing a single acrylic functionality, hydroxy-substituted monoacrylates and alkoxysilyl alkylacrylates, such as trialkoxysilylpropylmethacrylate. Other reactive monomers/diluents, such as monomers containing an ethylenic functional group (other than the acrylic-functional materials) may also be present.

Many acrylates can be represented by the following general formula I,

wherein R is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R is a linking group that links the acrylic functional groups together. Typically, R' is hydrogen or methyl, and n is an integer of from 1 to 3. More specifically, diacrylates (when n is 2) may be represented by general formula II,

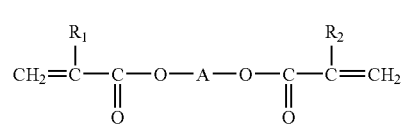

wherein $R_1$ and $R_2$ may be the same or different and are each selected from hydrogen or alkyl groups containing from 1 to 4 carbon atoms, preferably hydrogen or methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula III,

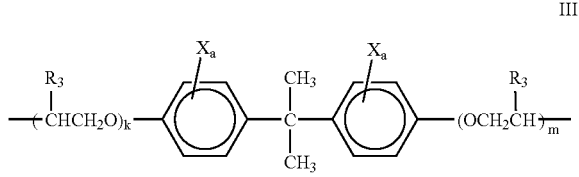

III wherein each $R_3$ is a hydrogen atom or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are numbers of from 0 to 20, e.g., 1 to 15, or 2 to 10. The values of k and m are average numbers and when calculated may be a whole number or a fractional number.

Acrylates having an epoxy group may be represented by the following general formula IV,

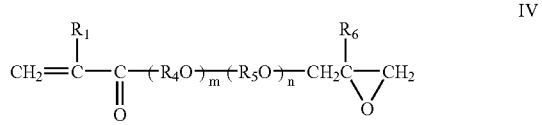

IV wherein $R_1$ and $R_6$ may be the same or different and are each selected from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are numbers of from 0 to 20, e.g., 0 or 1 to 15 or 2 to 10. When one of m and n is 0 and the other is 1, the remaining R group can be an aromatic group of the following formula V,

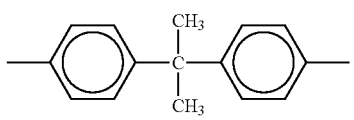

V e.g., a group derived from the 2,2'-diphenylenepropane radical, which phenyl groups may be substituted with $C_1$ to $C_4$ alkyl groups or halogens, e.g., methyl and/or chlorine.

The amount, number and type of functional acrylates comprising the curable AB film formulation will vary and will depend on the physical properties of the film that are most desired since, for example, varying the cross-link density of the film, e.g., by varying the amount of tri-functional acrylates or other cross-linking monomers used in the AB film formulation, will alter the final properties of the film. It is generally accepted that the cross-link density of the cured film is a function of the amount of multifunctional acrylates used. High amounts of multifunctional acrylates lead to high hardness, tensile strength and chemical resistance, but with poorer adhesion to the substrate. In contrast, reducing the amount of multifunctional acrylates and increasing the amount of monofunctional acrylates lead to a lower cross-link density of the cured film with consequent lower hardness, chemical resistance and tensile strength, and a slower cure speed. Therefore, one skilled in the art may vary the amounts of mono- and multi-functional acrylate monomers used depending on whether it is desirable to optimize adhesion to the polymeric coating, hardness (scratch resistance), chemical resistance, e.g., resistance to aqueous alkali metal hydroxide treatment, or other properties; or whether it is desirable to compromise one or more of these properties to obtain an average benefit for all of those physical properties. One skilled in the art can readily select the combination of monomeric materials to be used for the AB film based on the art-recognized benefits that certain functional groups provide to a radiation-cured acrylate film, and the tests described in this specification that measure the desired physical properties.

Exemplary of acrylate-based tie layer formulations include those wherein diacrylate material(s) comprise from 0 to 80 weight percent, desirably from 0 or 3 to 60 weight percent, more desirably, from 10 or 15 to 45 or 50, e.g., 20 to 45 (particularly 25 to 35 or 45) weight percent, of the formulation. Desirably, the acrylate-based tie layer formulation contains at least one diacrylate material. The formulation also may contain one or more triacrylate materials, but if a triacrylate material is not used, then cross-linking can be provided by another monomer material in the formulation. Triacrylates may comprise from 0 to 25 or 30 weight percent, e.g., 0 or 5 to 15 or 30, or 10 or 15 to 25 weight percent, of the formulation. Higher functional acrylate materials, e.g., tetraacrylates, pentaacrylates and mixtures of tetraacrylates and pentaacrylates, may also be used in the formulation, such as in amounts of from 3 to 15 weight percent, particularly 5 to 10 weight percent, e.g., in amounts of approximately 5 weight percent. Monoacrylate materials may comprise from 0 or 10 to 75 or 100 weight percent of the formulation, desirably from 25 to 85 weight percent, more desirably from 35 to 75, e.g., from 40 to 70 weight percent, of the formulation. In particular, when the monoacrylate is a hydroxy-functional acrylate, it may comprise from 35 to 75, e.g., from 40 to 60, weight percent of the formulation. If alkoxysilyl acrylates are used in the formulation, from 5 to 15 weight percent of such materials can be used.

The aforedescribed percentages of the functional acrylate monomers are based on the total quantity of polymerizable monomeric materials comprising the curable AB film formulation, not including other components, such as non-polymerizable organic diluents, e.g., solvents, photoinitiators, stabilizers, plasticizers and other such components. The total of all of the various polymerizable monomeric materials comprising the curable AB film formulation will, of course, equal 100 percent. The percentage of each of the functional acrylate monomers described heretofore can vary between any combination of the stated values, inclusive of the stated values.

In a further contemplated embodiment of the present invention, the acrylate-based film is prepared from a composition comprising a mixture of free-radical initiated acrylate monomer(s) and cationic initiated epoxy monomer(s). The curable composition may comprise from 10 to 85 percent by weight of at least one epoxy monomer(s) and from 90 to 15 percent by weight of at least one acrylate monomer(s), more typically, from 30 to 70 weight percent epoxy monomer(s) and from 70 to 30 weight percent acrylate monomer(s), and preferably from 35 to 50 weight percent epoxy monomer(s) and from 65 to 50 weight percent acrylate monomers. Monomers containing both epoxy and acrylic functionality are categorized herein as acrylate monomers. The range of acrylate monomers and epoxy monomers in the curable composition described heretofore can vary between any combination of the stated values, inclusive of the stated values.

Epoxy monomers used in the AB film formulation are those monomers that are initiated by cationic initiators. The preferred epoxy monomers are epoxy condensation polymers, such as polyglycidyl ethers of alcohols and phenols, and certain polyepoxy monomers and oligomers. The epoxy monomers improve adhesion of the cured AB film to the photochromic coating and enhance other properties of the cured AB film, such as improving the adhesion of an abrasion-resistant coating, e.g., a siloxane coating, to the cured AB film. Cured AB films prepared with epoxy monomers also appear to improve the abrasion resistance of the abrasion-resistant coating (hard coat), when used, that is applied to the photochromic coating and results also in less crazing of the antireflective coating (when used over the hard coat).

In the following detailed examples of identified acrylate monomer materials, the term "acrylate" is intended to mean and include the corresponding alkyl acrylates containing from 1 to 4 carbon atoms in the alkyl group, particularly the corresponding methacrylate; and where the alkyl acrylate, e.g., methacrylate, is identified, the corresponding acrylate is contemplated. For example, reference to hydroxyethyl acrylate in the examples includes hydroxyethyl methacrylate, hydroxyethyl ethacrylate, etc.; and reference to ethylene glycol diacrylate includes, for example, ethylene glycol dimethacrylate, ethylene glycol diethacrylate, etc. Non-limiting examples of such monomer materials include:

Hydroxyethyl acrylate,
Hydroxypropyl acrylate,
Hydroxybutyl acrylate,
Hydroxy-poly(alkyleneoxy)alkyl acrylate,
Caprolactone acrylate,
Ethylene glycol diacrylate,
Butanediol diacrylate,
Hexanediol diacrylate,
Hexamethylene diacrylate,
Diethylene glycol diacrylate,
Triethylene glycol diacrylate,
Tetraethylene glycol diacrylate,
Polyethylene glycol diacrylate,
Dipropylene glycol diacrylate,
Tripropylene glycol diacrylate,
Tetrapropylene glycol diacrylate,
Polypropylene glycol diacrylate,
Glyceryl ethoxylate diacrylate,
Glyceryl propoxylate diacrylate,
Trimethylolpropane triacrylate
Trimethylolpropane ethoxylate triacrylate,
Trimethylolpropane propoxylate triacrylate,
Neopentyl glycol diacrylate,
Neopentyl glycol ethoxylate diacrylate,
Neopentyl glycol propoxylate diacrylate,
Monomethoxy trimethylolpropane ethoxylate diacrylate,
Pentaerythritol ethoxylate tetraacrylate,
Pentaerythritol propoxylate tetraacrylate,
Dipentaerythritol pentaacrylate,
Dipentaerythritol ethoxylate pentaacrylate,
Dipentaerythritol propoxylate pentaacrylate,
Di-trimethylolpropane ethoxylate tetraacrylate,
Bisphenol A ethoxylate diacrylate containing from 2 to 20 ethoxy groups,
Bisphenol A propoxylate diacrylate containing from 2 to 20 propoxy groups,
Bisphenol A alkoxylated diacrylate containing a mixture of from 2 to 20 ethoxy and propoxy groups,
Bisphenol A glycerolate dimethacrylate,
Bisphenol A glycerolate (1 glycerol/1 phenol) dimethacrylate,
Glycidyl acrylate,
β-methylglycidyl acrylate,
Bisphenol A-monoglycidyl ether acrylate,
4-glycidyloxybutyl methacrylate,
3-(glycidyl-2-oxyethoxy)-2-hydroxypropyl methacrylate,
3-(glycidyloxy-1-isopropyloxy)-2-hydroxypropyl acrylate,
3-(glycidyloxy-2-hydroxypropyloxy)-2-hydroxypropyl acrylate, and
3-(Trimethoxysilyl)propyl methacrylate.

Epoxy monomers, e.g., monomers having at least one epoxy group in the molecule may be represented by the following general formula VI,

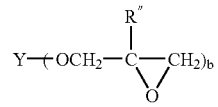

wherein Y is a residue of a b-valent alcoholic hydroxyl compound, a residue of a b-valent phenolic hydroxyl group-containing compound, or a residue of a b-valent carboxylic acid, R" is a hydrogen atom or a methyl group, and b is an integer of from 1 to 4, preferably 1 to 2. These materials include alcoholic hydroxyl group-containing compounds of monohydric dihydric or trihydric alcohols, reaction products between phenolic hydroxyl compounds, such as phenol and hydroquinone, and epichlorohydrin, and reaction products between carboxylic acids, such as benzoic acid and terephthalic acid, and epichlorohydrin.

The epoxy monomer represented by formula VI may also contain (as part of Y) a radical polymerizable group (other than acrylic) such as a vinyl group or an allyl group. Monomers containing an acrylic polymerizable group and an epoxy group are categorized herein with the acrylate monomer(s) previously described.

Examples of epoxy monomer compounds having at least one epoxy group in the molecule and not having a polymerizable group include those of formula VI wherein b is 1 or 2. When b is 1, Y can be an alkyl group having from 2 to 20 carbon atoms, which may be substituted by a hydroxyl group, a cycloalkyl group having from 6 to 7 carbon atoms, which may be substituted by a hydroxyl group, a phenyl group, which may be substituted by a hydroxyl group, a benzoyl group, which may be substituted by a carboxyl group, or a hydroxyalkyleneoxy group. When b is 2, Y can be an alkylene group containing from 2 to 20 carbon atoms, which may be substituted by a hydroxyl group, a cycloalkylene group, which may be substituted by a hydroxyl group, a phenylene group, which may be substituted by a hydroxyl group, a phthaloyl group, an isophthaloyl group, a terephthaloyl group, a 2,2'-bisphenylene propyl group, and an alkyleneoxy group. The alkyleneoxy group can have from 1 to 20 alkyleneoxy groups, and the alkylene moiety can have from 2 to 4 carbon atoms.

Examples of epoxy compounds include ethylene glycol glycidyl ether, propylene glycol glycidyl ether, 1,4-butanediol diglycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexanediol diglycidyl ether, propylene carbonate, bisphenol A or hydrogenated bisphenol A propylene oxide adduct, diglycidyl ester of terephthalic acid, spiroglycol diglycidyl ether, hydroquinone diglycidyl ether and 3,4-epoxycyclohexane carboxylate.

Epoxy condensation polymers that may be used are polyepoxides having a 1,2-epoxy equivalency greater than 1, e.g., up to 3. Examples of such epoxies are polyglycidyl ethers of polyhydric phenols and aliphatic (cyclic and alicyclic) alcohols. These polyepoxides can be produced by etherification of the polyhydric phenol or aliphatic alcohol with an epihalohydrin, such as epichlorohydrin, in the presence of an alkali, such as sodium hydroxide. Examples of suitable polyphenols are 2,2-bis(4-hydroxyphenyl)propane, i.e., bisphenol A, 1,1-bis(4-hydroxyphenyl)ethane, and 2-methyl-1,1-bis(4-hydroxyphenyl)propane. Examples of aliphatic alcohols include ethylene glycol, diethylene glycol, 1,2-propylene glycol, 1,4-butylene glycol, 1,2-cyclohexanediol, 1,4-cyclohexanediol, 1,2-bis(hydroxymethyl)cyclohexane and hydrogenated bisphenol A. These epoxies are available from Resolution Performance Products under the EPON trade name.

Examples of polyepoxide monomers and oligomers are described in U.S. Pat. No. 4,102,942 (column 3, lines 1-16), which disclosure is incorporated herein by reference. Specific examples of such polyepoxides are 3,4-epoxycyclohexylmethyl, 3,4-epoxycyclohexanecarboxylate and bis(3,4-epoxycyclohexylmethyl)adipate. Aliphatic polyepoxides are available from the Dow Corporation under the CYRACURE trade name.

Monomeric materials that comprise the curable AB film formulation are commercially available; and, if not commercially available, can be prepared by procedures well known to those skilled in the art. Examples of commercial acrylate materials can be found in U.S. Pat. No. 5,910,375, particularly in the disclosure found in column 8, lines 20-55, and in column 10, lines 5-36, which disclosure is incorporated herein by reference. Commercially available acrylate materials are available from various manufacturers and include those sold under the tradenames, SARTOMER, EBECRYL, and PHOTOMER.

The curable AB film formulation will also contain at least one free radical photoinitiator when cured by UV radiation. When the formulation includes cationic initiated epoxy monomer(s), the formulation will also contain at least one cationic photoinitiator. Preferably, a combination of photoinitiators is used. A photoinitiator is not required when the resin formulation is to be cured by an electron beam process. The photoinitiator will be present in amounts sufficient to initiate and sustain the curing of the formulation, i.e., an initiating amount. Photoinitiators are preferably used in the least amount necessary to obtain initiation of the curing process. Generally, the photoinitiator(s) will be present in amounts of from 0.5 to 10 weight percent, typically from 0.5 to 6 weight percent, more usually from 1 to 4 weight percent, based on the total weight of the photoinitiated polymerizable components in the curable AB film formulation. Free radical photoinitiators are discussed and described above in connection with the photochromic polymer coating. That discussion is applicable here also in connection with the curable AB film and is hereby incorporated here. Further examples of commercial photoinitiators may be found in column 10, lines 38-43 of U.S. Pat. No. 5,910,375, which disclosure is incorporated herein by reference.

Cationic photoinitiators can be used in conjunction with the free-radical photoinitiators. Preferably, cationic initiators are used with abstraction type photoinitiators, hydrogen donor materials such as butyryl choline triphenylbutyl borate or combinations of such materials. Preferred cationic photoinitiators are onium salts, which are described in U.S. Pat. No. 5,639,802, column 8, line 59 to column 10, line 46, which disclosure is incorporated herein by reference. Examples of such initiators include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate, triaryl sulfonium hexafluoroantimonate salts and triaryl sulfonium hexafluorophosphate salts, e.g., triphenylsulfonium salt of phosphorous hexafluoride. Mixtures of cationic initiators may also be used.

In addition to the above-described components, the AB film formulation may include other additives known to those skilled in the art. These additives may include, but are not limited to, flow and leveling additives, wetting agents, antifoaming agents, UV absorbers, rheology modifiers, surfactants, e.g., fluorosurfactants, stabilizers and antioxidants. Such materials are well known to those skilled in the art, and examples of some commercial surfactants and antioxidants/stabilizers may be found in column 10, lines 43-54 of the aforementioned '375 patent, which disclosure is incorporated herein by reference. Other examples of such additives include silicones, modified silicones, silicone acrylates, hydrocarbons, and other fluorine-containing compounds.

The curable AB film formulation is prepared by mixing the components of the formulation at room temperature, although mild heating may be used to facilitate mixing and blending. The formulation may be applied to the photochromic coating by the same procedures that have been described for applying the photochromic coating to the plastic substrate, e.g., spin coating and dip coating. In a contemplated embodiment, the photochromic coating is first treated to enhance adhesion of the AB film, e.g., by treatment with a plasma discharge. Surface treatments with plasma are discussed above and that discussion is also applicable here. One contemplated plasma treatment involves use of a plasma generated by a Plasmatech machine operating at a power level of 750 Watts for from 1 to 10, e.g., 2 to 5 minutes, while introducing 400 ml/minute of oxygen into the vacuum chamber of the Plasmatech machine.

The curable AB film is applied in a manner to obtain a substantially homogeneous cured film, which can range in thickness from 2 to 20 microns, e.g., 2 to 15 microns, more typically from 3 to 10 microns, e.g., from 4 to 8 microns, more usually in the vicinity of 5 microns. The film thickness may range between any combinations of these values, inclusive of the recited values. It is contemplated that more than one AB film can be used as the tie layer, and that such multiple films may be of different compositions and hardness values. The term "film" is generally considered by those skilled in the coating art to be a layer with a thickness of not more than 20 mils (500 microns); however, as used in this disclosure and claims, the term film when used in relation to the radiation-cured, acrylate-based film is defined as having a thickness, as herein described.

The applied film is then exposed to UV radiation (or to the EB process, if UV radiation is not used.) Any appropriate type of UV lamp, e.g., mercury vapor or pulsed xenon, may be used. The absorbance spectra of the photoinitiator(s) should be matched with the spectral output of the UV lamp (bulb), e.g., an H bulb, D bulb, Q bulb or V bulb, for the highest curing efficiency. The cure process is generally more efficient when oxygen, e.g., air, is excluded from the cure process. This may be accomplished by using a nitrogen blanket over the applied film during the cure process.

Following the UV cure, a thermal post cure may be used to cure completely the AB film. Heating in an oven at 212° F. (100° C.) for from 0.5 to 3 hours is usually adequate to thoroughly cure the AB film. The previous discussion respecting radiation curing of the photochromic coating is also applicable here in connection with the cure of the AB film.

In a further contemplated embodiment, an abrasion-resistant coating is applied to the AB film. In such an embodiment, the post thermal cure of the AB film can be postponed until after application of the abrasion-resistant coating if there is no significant physical handling of the AB film coated product until after application of the abrasion-resistant coating. If such handling is required, it is preferable that the thermal post cure of the AB film be performed prior to application of the abrasion-resistant coating.

The cured AB film should be transparent, e.g., optically clear when used for optical, e.g., ophthalmic, applications, and not significantly impair the optical properties of the photochromic coated substrate. The terms "transparent" and "optically clear" are defined earlier in this disclosure. The surface of the cured AB film(s) is preferably harder than the photochromic coating to which it is applied, and is usually softer than the abrasion-resistant coating that is commonly applied to the AB film. As described, the cured AB film should be scratch resistant, adhere well to the photochromic coating, be resistant to treatment with aqueous inorganic caustic solutions, and be compatible with abrasion resistant coatings that are prepared with organo-silane(s).

The scratch resistance of the acrylate-based film may be measured by the conventional steel wool scratch test. This test measures the average haze gain of a surface subjected to abrasion by very fine steel wool. In accordance with a preferred embodiment of the present invention, the average haze gain should be less than 20, preferably less than 15, more preferably less than 10, and still more preferably less than 8. An Eberbach Steel Wool Abrasion Tester can be used to determine surface scratch resistance.

In performing the steel wool scratch test, 000 steel wool, e.g., Rhodes extra fine steel wool, is mounted over the end of a one-inch (2.54 cm) by one-inch (2.54 cm) mandrel. The sample to be tested, e.g., a lens, is cleaned with mild warm soapy water, rinsed with water, and then air-dried. The lens is then conditioned for at least 2 hours at 23+/−3° C. and 50%+/−10% relative humidity. The light transmission of the sample at 550 nm is measured using a Haze Gard Plus instrument, which is manufactured by BYK-Gardner. The conditioned sample is mounted onto the Eberbach testing platform. If a lens is to be tested, it is centered on the testing platform with the concave side down. The mandrel is weighted with 5 pounds (2.3 kg) of weight and lowered onto the sample. The sample is cycled back and forth under and in contact with the steel wool at a rate of 100 times per minute for two minutes so that the sample passes under the steel wool 200 times. The sample is cleaned again with mild warm soapy water, rinsed with water and dried. The light transmission of the sample at 550 nm is re-measured. The difference between the light transmission values before and after testing, i.e., the delta ($\Delta$) in light transmission, is the haze gain.

A Bayer Abrasion Tester can also be used to determine surface abrasion resistance. The resistance of a product to abrasion is quantified by measuring the haze of the test sample after abrasion and comparing that value to that measured on a control sample, e.g., a plano lens prepared from diethylene glycol bis(allyl carbonate) in the case of an ophthalmic product. Usually, measurements are made on multiple pairs of test sample/controls, e.g., 5 pairs. The samples and controls to be tested are cleaned with mild soapy water, rinsed with water and then dried with air. The test samples and controls are conditioned for a minimum of 2 hours, while the abrasive material is conditioned for a minimum of 24 hours, in a temperature and humidity controlled environment (23+/−3° C. and 50+/−10% relative humidity). The light transmission of the test sample and control at 550 nm is measured using a Haze-Gard Plus device. The test sample and control are mounted on the Bayer Abrader and the abrasion medium, e.g., alumina (Norton ZF E-327 grit #12), placed in the pan of the Abrader. When lenses are tested, they are mounted convex side down. The Abrader is operated for 4 minutes at a rate of 150 cycles per minute for a total of 600 cycles. Both the test samples and controls are cleaned with mild soapy water, rinsed and dried with air. The haze of the test samples and controls are again measured at 550 nm using the Haze Gard Plus device. The haze gain is calculated from the difference in light transmission values before and after abrading. The Bayer Haze Gain Ratio is determined by dividing the measured haze of the control by that of the test sample (Haze Gain Ratio=Haze (control)/Haze (test sample). The Bayer haze gain ratio for the radiation cured AB film should be greater than 0.6, preferably greater than 0.8.

The radiation cured AB film should also adhere firmly to the photochromic coating applied to the plastic substrate. Adhesion may be determined by the conventional art recognized crosshatch tape peel adhesion test, and by a boiling water crosshatch tape peel adhesion test, which is a more stringent test. The former is often referred to as the primary (1°) test or dry test; while the later is often referred to as the secondary (2°) or wet test. In the primary test, a cutting tool composed of eleven blades spaced approximately 1 mm apart (tip to tip) and 0.65 mm thick is used to make a first long cut on the sample followed by second and third cuts, which are made at 90 degrees to and across the first cut. The second and third cuts are separated from each other to provide separate crosshatch zones. A piece of Scotch 3M masking tape one inch (2.54 cm) wide and 2 to 2½ inches long (5 to 6.3 cm) is applied in the direction of the first cut and pressed down to smooth out any bubbles. The tape is then peeled off the surface with a sharp, rapid, even and continuous movement. The procedure is repeated with a fresh piece of tape. A small piece of tape (1½ inches, 3.8 cm) is applied to each of the crosshatch zones produced by the second and third cuts in a direction 90 degrees to the direction of the first tape, and these pieces of tape also peeled off the surface with a sharp, rapid, even and continuous movement. If no more than one square out of a 100 squares of the grid produced by the cutting tool is found to have debonded from the substrate (photochromic coating), the coating is deemed to pass the adhesion test. In accordance with the present invention, the radiation-cured AB film should pass the crosshatch tape peel adhesion test to be considered to have adhered to the photochromic coating. Stated differently, if the radiation-cured AB film passes the crosshatch tape peel test, it is referred to herein as being coherently appended (or cohesively appended) or attached to the layer, e.g., the photochromic coating, to which it is appended.

A further more severe adhesion test, i.e., the secondary or wet adhesion test, optionally may be performed to assess the adhesion of the radiation-cured AB film to the photochromic coating. This further test, i.e., the boiling water cross-hatch adhesion test, involves placing the test sample, e.g., lens, which has been scored with cross hatches, as described above, in boiling deionized water for 30 minutes. After the test sample has cooled to room temperature, the crosshatch tape peel adhesion test, as described above, is performed again. The same pass/fail requirements that were described for the crosshatch adhesion test are used for this boiling water modification of the test.

The radiation-cured AB film should also be resistant to removal by aqueous inorganic caustic solutions, e.g., relatively dilute alkali metal hydroxide solutions, such as solutions of sodium hydroxide or potassium hydroxide. The film is considered to be resistant to removal by such solutions if the thickness of the film is reduced not more than 0.5 micron after exposure to 12.5% aqueous potassium hydroxide at 140° F. (60° C.) for four minutes. Preferably, the film thickness is not reduced more than 0.5 microns after two exposures, more preferably after three exposures, to the aqueous potassium hydroxide solution.

Additionally, it is preferred that the radiation-cured AB film serves to protect the photochromic coating by substantially inhibiting the migration of photochromic material from the photochromic coating into the superimposed AB film, and further by serving as a barrier film for the photochromic coating. Photochromic migration can be evaluated by comparing the saturated optical density (OD) and the bleach half-life (T½), of photochromic articles of the present invention, i.e., an article with a radiation-cured AB film, that has been heated in a 100° C. oven for 3 hours with a similar photochromic article (a control) that does not have the AB film. If photochromic migration occurs, it will be observed by a decrease in the saturated optical density and an increase in the bleach half-life. Consideration of both the bleached half-life and saturated optical density delta values is required to determine if photochromic migration has occurred because the AB film might serve as a filter of incident light falling on the AB film and passing through to the photochromic coating. Preferably, the increase in bleach half-life and the decrease in saturated optical density does not change more than 20%, preferably not more than 16%, more preferably less than 10%, and still more preferably not more than 5%, of the control values.

The saturated optical density and bleach half-life of a photochromic article may be measured using a conventional optical bench, which apparatus is well known to those skilled in the art. Test samples are exposed to UV irradiation on the optical bench using commonly a Xenon arc lamp. The change in optical density ($\Delta$OD) from the bleached state to the darkened state is determined by establishing the initial transmittance of the sample (bleached state), exposing the samples to the Xenon arc lamp to provide UV radiation and thus activate the photochromic material(s) to produce the darkened state. Exposure to the Xenon arc lamp is for a time sufficient to allow the photochromic material to reach a saturated state of equilibrium. The change in optical density is calculated according to the formula: $\Delta$OD=log (% Tb/% Ta), wherein % Tb is the percent transmittance in the bleached state, % Ta is the percent transmittance in the activated (darkened) state, and the logarithm is to the base 10. The bleach rate (T½) is the time interval in seconds for the $\Delta$OD of the activated form of the photochromic material(s) in the article to reach one-half of the highest $\Delta$OD after removal of the source of activating radiation, i.e., the Xenon arc lamp.

In accordance with the present invention, the radiation-cured AB film is also compatible with organo silane abrasion-resistant coatings used to protect plastic surfaces from abrasions, scratches, etc. Organo silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 4, lines 1-45; and U.S. Pat. No. 5,462,806 at column 1, lines 58 through column 2, line 8, and column 3, line 52 through column 5, line 50, which disclosures describe organo silane hard coatings and which disclosures are incorporated herein by reference. Reference is also made to U.S. Pat. Nos. 4,731,264, 5,134,191, 5,231,156 and International Patent Publication WO 94/20581 for disclosures of organo silane hard coatings, which disclosures are also incorporated herein by reference.

While a described physical feature of the radiation-cured AB film is that it be compatible with organo silane hard coatings, other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. One skilled in the art can readily determine if the AB film is compatible with organo silane hard coats by applying an organo silane hard coat to the AB film and determining the compatibility of the AB film to that hard coat by means of the cross-hatch tape peel adhesion test, which is performed on the hard coat. Preferably, the hard coating is a silicone-based system.

By use of the term "compatible with an organo silane abrasion resistant coating (hard coat)" is meant that the AB film is capable of having organo silane hard coat deposited on its surface and that the organo silane hard coat adheres to the AB film under ordinary handling/wear conditions, as determined by the crosshatch tape peel adhesion test. Naturally, the organo silane hard coat can be removed by treatment with concentrated aqueous caustic, or severe mechanical abrasion. Further, the term abrasion-resistant organo silane-containing coating (or other such similar meaning terms) is meant that the abrasion-resistant coating is prepared from a composition comprising at least one organo silane.

In one embodiment, the hard coat may be prepared from a composition comprising from 35 to 95 weight percent, as calculated solids, of at least one organo silane monomer represented by the following empirical formula VII:

$$R^1SiW_3 \qquad \text{VII}$$

wherein $R^1$ may be glycidoxy($C_1$-$C_{20}$)alkyl, preferably glycidoxy($C_1$-$C_{10}$)alkyl, and most preferably, glycidoxy ($C_1$-$C_4$) alkyl; W may be hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halogen being bromo, chloro or fluoro. Preferably, W is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halogen is chloro or fluoro. More preferably, W is hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy.

The weight percent, as calculated solids, of the silane monomers represented by empirical formula VII in the hard coat composition is preferably from 40 to 90, more preferably from 45 to 85, and most preferably from 50 to 70 weight percent calculated solids. The weight percent calculated solids are determined as the percent of the silanol that theoretically forms during the hydrolysis of the orthosilicate.

Suitable silane monomers represented by general formula VII include
glycidoxymethyltriethoxysilane,
glycidoxymethyltrimethoxysilane,
alpha-glycidoxyethyltrimethoxysilane,
alpha-glycidoxyethyltriethoxysilane,
alpha-glycidoxypropyltrimethoxysilane,
alpha-glycidoxypropyltriethoxysilane,
alpha-glycidoxypropyltrimethoxysilane,
alpha-glycidoxypropyltriethoxysilane, beta-glycidoxyethyltrimethoxysilane,
beta-glycidoxyethyltriethoxysilane,
beta-glycidoxypropyltrimethoxysilane,
beta-glycidoxypropyltriethoxysilane,
beta-glycidoxybutyltrimethoxysilane,
beta-glycidoxybutyltriethoxysilane,
gamma-glycidoxypropyltrimethoxysilane,
gamma-glycidoxypropyltriethoxysilane,
gamma-glycidoxypropyltripropoxysilane,
gamma-glycidoxypropyltributoxysilane,
gamma-glycidoxypropyltrimethoxysilane,
gamma-glycidoxypropyltriphenoxysilane,
gamma-glycidoxybutyltrimethoxysilane,
gamma-glycidoxybutyltriethoxysilane,
delta-glycidoxybutyltrimethoxysilane,
delta-glycidoxybutyltriethoxysilane,
hydrolyzates of such silane monomers, and mixtures of such silane monomers and hydrolyzates thereof.

The hard coat composition of the foregoing described embodiments may further include from 5 to 65 weight percent, as calculated solids, of: (a) silane monomers represented by empirical formula VIII; (b) metal alkoxides represented by empirical formula IX; or (c) a mixture thereof in a weight ratio of (a):(b) of from 1:100 to 100:1. Preferably, the hard coat composition includes from 10 to 60 weight percent calculated solids, more preferably from 15 to 55, and most preferably from 30 to 50 weight percent calculated solids of the aforementioned materials (a), (b) or (c).

The hard coat composition may include at least one silane monomer represented by the following empirical formula VIII:

$$R^2{}_b(R^3)_c SiZ_{4-(b+c)} \qquad \text{VIII}$$

wherein $R^2$ may be $C_1$-$C_{20}$ alkyl, $C_1$-$C_{20}$ haloalkyl, $C_2$-$C_{20}$ alkenyl, $C_2$-$C_{20}$ haloalkenyl, phenyl, phenyl($C_1$-$C_{20}$)alkyl, $C_1$-$C_{20}$ alkylphenyl, phenyl($C_2$-$C_{20}$)alkenyl, $C_2$-$C_{20}$ alkenylphenyl, morpholino, amino($C_1$-$C_{20}$)alkyl, amino($C_2$-$C_{20}$)alkenyl, mercapto($C_1$-$C_{20}$)alkyl, mercapto($C_2$-$C_{20}$)alkenyl, cyano($C_1$-$C_{20}$)alkyl, cyano($C_2$-$C_{20}$)alkenyl, acryloxy, methacryloxy, or halogen. The halo or halogen may be bromo, chloro, or fluoro. Preferably, $R^2$ is a $C_1$-$C_{10}$ alkyl, $C_1$-$C_{10}$ haloalkyl, $C_2$-$C_{10}$ alkenyl, phenyl, phenyl($C_1$-$C_{10}$) alkyl, $C_1$-$C_{10}$ alkylphenyl, morpholino, amino($C_1$-$C_{10}$) alkyl, amino($C_2$-$C_{10}$) alkenyl, mercapto($C_1$-$C_{10}$)alkyl, mercapto ($C_2$-$C_{10}$) alkenyl, cyano($C_1$-$C_{10}$) alkyl, cyano($C_2$-$C_{10}$)alkenyl, or halogen and the halo or halogen is chloro or fluoro.

In formula VIII, $R^3$ may be $C_1$-$C_{20}$ alkylene, $C_2$-$C_{20}$ alkenylene, phenylene, $C_1$-$C_{20}$ alkylenephenylene, amino($C_1$-$C_{20}$)alkylene, amino($C_2$-$C_{20}$)alkenylene; Z may be hydrogen, halogen, hydroxy, $C_1$-$C_5$ alkoxy, $C_1$-$C_5$ alkoxy($C_1$-$C_5$) alkoxy, $C_1$-$C_4$ acyloxy, phenoxy, $C_1$-$C_3$ alkylphenoxy, or $C_1$-$C_3$ alkoxyphenoxy, said halo or halogen being bromo, chloro or fluoro; b and c are each an integer of from 0 to 2; and the sum of b and c is an integer of from 0 to 3. Preferably, $R^3$ is $C_1$-$C_{10}$ alkylene, $C_2$-$C_{10}$ alkenylene, phenylene, $C_1$-$C_{10}$ alkylenephenylene, amino($C_1$-$C_{10}$)alkylene, amino($C_2$-$C_{10}$) alkenylene, Z is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halo or halogen is chloro or fluoro.

Suitable silane monomers represented by general formula VIII include methyltrimethoxysilane, methyl-triethoxysilane, methyltrimethoxyethoxysilane, methyltri-acetoxysilane, methyltripropoxysilane, methyltributoxysilane, ethyltrimethoxysilane, ethyltriethoxysilane, and gamma-methacryloxypropyl trimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimethoxysilane, gamma-chloropropyl-methyldiethoxysilane, tetramethylorthosilicate, tetraethylorthosilicate, hydrolyzates of such silane monomers, and mixtures of such silane monomers and hydrolyzates thereof.

The hard coat composition may include at least one compound represented by empirical formula IX:

$$M(T)_q \qquad \text{IX}$$

wherein M is a metal selected from the group consisting of aluminum, antimony, tantalum, titanium and zirconium; T is $C_1$-$C_{10}$ alkoxy and q is an integer equivalent to the valence of M. Preferably, M is selected from aluminum, titanium and zirconium and T is $C_1$-$C_5$ alkoxy, e.g., propoxy.

The hard coat composition may also include from 0 to 20 weight percent, based on the total weight of the composition, of a metal oxide selected from the group consisting of silicon dioxide (silica), aluminum oxide (alumina), antimony oxide, tin oxide, titanium oxide, zirconium oxide and mixtures of such metal oxides. The metal oxide may be in the form of a sol. As used in the present specification, the term sol means and includes a colloidal dispersion of finely divided solid inorganic metal oxide particles in an aqueous or an organic liquid. The average size of such particles may range from 1 to 200 nanometers, preferably from 2 to 100 nanometers, and more preferably, from 5 to 50 nanometers.

Such metal oxide sols may be prepared by hydrolyzing a metal salt precursor for a time sufficient to form the desired particle size or such sols may be purchased commercially. Examples of commercially available metal oxide sols that may be used in the hard coat composition include NALCO® colloidal sols (available from NALCO Chemical Co.), REMASOL® colloidal sols (available from Remet Corp.) and LUDOX® colloidal sols (available from E.I. du Pont de Nemours Co., Inc.). Stable acidic and alkaline metal oxide sols are commercially available as aqueous dispersions. Preferably, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols may also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst may be an organic carboxylic acid or an inorganic acid. Examples of suitable catalysts include acetic acid, formic acid, glutaric acid, maleic acid, nitric acid, sulfuric acid and hydrochloric acid.

Organic solvents present in the hard coat composition may be added or formed in situ by the hydrolysis of the silane monomer(s). Suitable organic solvents are those that will dissolve or disperse the solid components of the coating composition. The minimum amount of solvent present in the coating composition is a solvating amount, i.e., an amount that is sufficient to solubilize or disperse the solid components in the coating composition. For example, the amount of solvent present may range from 20 to 90 weight percent based on the total weight of the coating composition and depends, in part, on the amount of silane monomer present in the coating composition. Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl) pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) may be present as a component in the hard coat composition. A leveling amount is that amount which is sufficient to allow the coating to spread evenly or to level the hard coat composition on the surface of the AB film to which it is applied. Preferably, the nonionic surfactant is a liquid at the conditions of use and is used in amounts from about 0.05 to about 1.0 weight percent based on the amount of the silane monomer(s). Suitable nonionic surfactants are described in the *Kirk Othmer Encyclopedia of Chemical Technology*, 3rd Edition, Volume 22, pages 360 to 377, the disclosure of which is incorporated herein by reference. Other potential nonionic surfactants include the surfactants described in U.S. Pat. No. 5,580,819, column 7, line 32 to column 8, line 46, which disclosure is incorporated herein by reference.

Examples of nonionic surfactants that may be used in the hard coat composition include ethoxylated alkyl phenols, such as the IGEPAL® DM surfactants or octyl-phenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by Byk Chemie and mixtures of such recited surfactants.

Water is also present in the hard coat composition in an amount sufficient to form hydrolysates of the silane monomer(s). The water present in the optional metal oxide sol may supply the amount of water necessary. If not, additional water may be added to the coating composition to provide the required additional amount necessary to hydrolyze the silane monomer(s).

The abrasion-resistant coating (hard coat) may be applied to the AB film using the same application techniques described with respect to the photochromic coating and the AB film, e.g., spin coating. The abrasion resistant film may be applied at a thickness of from 0.5 to 10 microns. Prior to applying the hard coat, e.g., the organo silane hard coat, to the AB film, the AB film may be treated to enhance its receptivity of and adhesion of the hard coat. Such treatments, e.g., plasma treatments, as are described above with respect to pretreatment of the photochromic coating prior to application of the AB film may be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111, the disclosures of which are incorporated herein by reference.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc.), which are identified in one example by a lower case letter in parenthesis, are similarly identified in subsequent examples.

EXAMPLE 1

In the following example, 6.25 base, 74 mm semi-finished plastic lenses prepared from diethylene glycol bis(allyl carbonate) were used. The test lenses were etched with 12% potassium hydroxide for 4 minutes at 60° C. and then rinsed with water. The lenses were then washed with warm soapy water, rinsed with deionized water and dried with compressed air. A very thin, e.g., monomolecular, primer layer was dispensed onto the surface of the lenses by spin coating. The primer layer composition was 89.6% diglyme solvent, 10% 3-(trimethoxysilyl)propyl methacrylate and 0.4% of the triphenylsulfonium salt of phosphorous hexafluoride, a cationic photoinitiator. The primer layer was cured by exposure to UV light for 4 seconds.

A photochromic methacrylic coating composition was prepared using 7.4 percent of an alkoxysilyl alkyl methacrylate monomer, 7.4 percent of a trimethacrylate monomer, 59.4 percent of dimethacrylate functional monomers, 2.97 percent of [1,2-b]naphthopyran photochromic compounds, 18.6 percent of organic solvent, 3.7 percent of antioxidants Irganox I-245 and I-3114, and 0.37 percent of photoinitiators Irgacure 819 and Lucirin TPO. A small amount of fixed tints and fluorinated surfactant was also added to the composition. The sum of all of the components of the composition totaled 100 percent.

The photochromic methacrylic coating was applied on top of the primer coating by spin coating to provide a coating thickness of about 30 microns. The photochromic coating was then cured in the presence of a nitrogen blanket by UV irradiation from a pulsed xenon bulb. After curing, the lens was baked for one hour in a 176° F. (80° C.) oven to remove any residual organic solvent from the coating.

The photochromic coating of the test lenses were treated with a plasma for 5 minutes using a Plasmatech machine operating at a 750-Watt power level while introducing oxygen at a rate of 400 ml/min into the vacuum chamber of the Plasmatech machine. The test lenses were then washed and dried and an acrylate-based film (AB film) composition prepared from the formulation reported in Table 1 was applied by spin coating to obtain a coating of approximately 5 microns. The coating was then cured in the presence of a nitrogen blanket by UV irradiation from a pulsed Xenon bulb.

TABLE 1

| Formulation | |
|---|---|
| Armour 500 resin (a) | 50.0% |
| Cyracure UVR-6110 (b) | 48.1% |
| CD-1011 (c) | 1.9% |

(a) An acrylate-based resin purchased from Gerber Coburn, which contains photoinitiator,
(b) A cycloaliphatic epoxy resin obtained from Dow Chemical
(c) Triarylsulfonium hexafluorophosphate cationic photoinitiator Several of the AB film coated test lenses were then baked for 1 hour at 212° F. (100° C.) in an oven, and the properties of the AB film tested. Such AB film coated lenses were subjected to an aqueous solution of 12% KOH at 60° C. for approximately 15 minutes in a hard coat clean line. A visual inspection of the lenses showed no damage to the AB film from the KOH solution. An AB film coated and baked test lens was tested for adhesion using the crosshatch peel test and was observed to pass both primary (dry) and secondary (wet) testing. Abrasion testing of such test lenses by the Bayer abrasion test and the steel wool scratch test resulted in a Bayer ratio of approximately 1 and a haze gain in the steel wool test of approximately 6, which demonstrates the AB film's scratch resistance.

Test lenses to which the AB film coating had been applied were coated further with an abrasion-resistant coating in the following manner. The surface of the AB film on the test lens was plasma treated for 5 minutes using a Plasmatech machine operating at a power level of 750 Watts while oxygen gas was introduced at a rate of 400 ml/min into the vacuum chamber of the Plasmatech machine. A siloxane-based abrasion-resistant coating (NT hard coat available from Essilor of America) was applied to the lens and cured by heating the lens for 3 hours at 212° F. (100° C.). A sample test lens was exposed to UV light and observed to change color. The lens changed back to its original color when the source of the UV light was removed. The sample test lens was tested for adhesion using the crosshatch peel test and was observed to pass both primary (dry) and secondary (wet) testing.

The hard coated test lens and a control lens, which was prepared in the same manner as the hard coated test lens, but which did not have the acrylate-based film layer, were tested for resistance to caustic. The hard coat layer was removed from both the test and control lenses. No damage to the acrylate-based film layer beneath the test lens was observed. The hard coated lens and the control lens were tested using the steel wool scratch test and the Bayer abrasion test. The haze gain for the steel wool test was about 0.2 for the test lens and about 1 for the control lens. In the Bayer abrasion test, the test lens had a Bayer ratio of about 5, while the control lens had a Bayer ratio of about 3. This data shows that use of the AB film improves the scratch resistance of the lens.

The hard coated test lenses were tested by tumbling them in a tumbler device containing scouring media (Tumble Mix from Colts Laboratories, Pinellas Park, Fla.) for 20 minutes to induce scratches on the surface of the lenses. The scouring media is commonly used to simulate 2 years of wear on a hardcoat. The tumbler device is also available from Colts Laboratory. The sample lenses were then soaked in isopropanol for one hour. The soaked lenses were blow dried with air and viewed in a strip light. The lenses were evaluated on a scale of 1 to 4 regarding the number and size of swelled defects (1=no swelling, 2=light swelling, 3=moderate swelling, and 4=severe swelling) to determine the degree of apparent swelling of the photochromic coating below the scratches produced on the hard coat during tumbling. This test is referred to as the Tumble/IPA test. The test lens exhibited no swelling (a rating of 1), whereas the control lens showed severe swelling (a rating of 4).

As a measure of anti-reflective (AR) coating compatibility, hard coated test lenses (and a control lens having no AB film beneath the hard coat) were AR coated with Reflection Free antireflective coating by Essilor of America. These lenses were tested for the temperature at which the AR coating crazes using an oven soak test. After AR coating, lenses are inspected for cracking or crazing of the AR coating. If no crazing is found, then a minimum of one sample and one control lens are heated in a convection oven at 50° C. for one hour. The test lenses are allowed to cool to room temperature for thirty minutes and again inspected for cracking or crazing of the photochromic coating and/or AB film. If none are present, then the oven temperature is increased 10° C. and the process repeated. This cycle of heating, cooling and inspection continues until crazing develops on the photochromic coating and/or AB film surface. The crazing temperature is confirmed with fresh sample lenses by testing the lenses at the craze temperature observed and at a temperature that is 10° C. lower to confirm that no crazing occurs at the lower temperature. Sample lenses having the AB film crazed at 80° C., while control lenses having no AB film (only the photochromic coating) crazed at 50° C. This data shows that use of the AB film substantially increased the crazing temperature of the lens.

EXAMPLE 2

In the following example, 6.25 base, 74 mm semi-finished plastic lenses prepared from diethylene glycol bis(allyl carbonate) were used. The test lenses were etched with 12% potassium hydroxide for 4 minutes at 60° C. and then rinsed with water. The lenses were then washed with warm soapy water, rinsed with deionized water and dried with compressed air. A very thin, e.g., monomolecular, primer layer was dispensed onto the surface of the lenses by spin coating. The primer layer composition was 89.6% diglyme solvent, 10% 3-(trimethoxysilyl)propyl methacrylate and 0.4% of the triphenylsulfonium salt of phosphorous hexafluoride, a cationic photoinitiator. The primer layer was cured by exposure to UV light for 4 seconds.

A photochromic methacrylic coating composition was prepared using approximately 7.8 percent of an alkoxysilyl alkyl methacrylate monomer, 7.8 percent of a trimethacrylate monomer, 62.7 percent of dimethacrylate functional monomers, 4.7 percent of [1,2-b]naphthopyran photochromic compounds, 11.8 percent of organic solvent, 1.7 percent of antioxidant Irganox I-245, 3.1 percent of a polymerizable HALS (the hindered amine light stabilizer FA-711MM available from Hitachi Chemical Co.) and 0.39 percent of the photoinitiators Irgacure 819 and Lucirin TPO. A small amount of fixed tints and fluorinated surfactant were also added to the coating composition. The sum of all of the components of the coating composition totaled 100 percent.

The photochromic methacrylic coating composition was applied on top of the primer coating by spin coating to provide a coating thickness of about 30 microns and the photochromic coating cured in the presence of a nitrogen blanket by UV irradiation from a pulsed Xenon bulb. After curing, the lens was baked for one hour in a 176° F. (80° C.) oven to remove any residual organic solvent from the coating.

Test lenses coated with the photochromic coating were plasma treated using a Plasmatech machine for 5 minutes at a 750-Watt power level while introducing oxygen at a rate of 400 ml/min into the vacuum chamber of the Plasmatech machine. The lenses were then washed and dried and an acrylate-based film (AB film) prepared from the formulation reported in Table 2 was applied by spin coating to obtain a coating of approximately 10 microns. The coating was then cured in the presence of a nitrogen blanket by UV irradiation from a pulsed Xenon bulb.

TABLE 2

| Formulation | |
|---|---|
| SR-399 (d) | 4.0% |
| SR-350 (e) | 24.2% |
| SR-348 (f) | 28.2% |
| Epon 828 (g) | 24.2% |
| A-187 (h) | 16.1% |
| BAPO (i) | 0.08% |
| CD-1011 (c) | 3.2% |

(d) Dipentaerythritol pentaacrylate obtained from Sartomer Company
(e) Trimethylolpropane trimethacrylate obtained from Sartomer Company
(f) Ethoxylated Bisphenol A Dimethacrylate obtained from Sartomer Company
(g) A bisphenol A/epichlorohydrin based epoxy resin obtained from Resolution Performance Products
(h) Gamma-glycidoxypropyl trimethoxysilane monomer obtained from OSI Specialty Chemicals
(i) Bisacrylphosphine oxide (Irgacure 819 from Ciba-Geigy) photoinitiator Several of the AB film coated test lenses were then baked for 1 hour at 212° F. (100° C.) in an oven, and the properties of the AB film tested. Such AB film coated lenses were subjected to an aqueous solution of 12% KOH at 60° C. for approximately 7 minutes in a hard coat clean line. A visual inspection of the lenses showed no damage to the AB film from the KOH solution. An AB film coated and baked test lens was tested for adhesion using the crosshatch peel test and was observed to pass both primary (dry) and secondary (wet) testing. Abrasion testing of such test lenses by the Bayer abrasion test and the steel wool scratch test resulted in a Bayer ratio of approximately 0.6 and a haze gain in the steel wool test of approximately 16, which demonstrates the AB film's scratch resistance.

Test lenses to which the AB film coating had been applied were coated further with an abrasion-resistant coating in the following manner. The surface of the AB film on the test lens was plasma treated for 5 minutes using a Plasmatech machine operating at a power level of 600 Watts while oxygen gas was introduced at a rate of 400 ml/min into the vacuum chamber of the Plasmatech machine. A siloxane-based abrasion-resistant coating (Silvue 124 obtained from SDC Technologies) was applied to the test lenses by Transitions Optical, Ltd and cured by heating for 5 hours at 221° F. (105° C.). Test lenses were exposed to UV light and observed to change color. The lenses changed back to their original color when the source of UV light was removed. A test lens was tested for adhesion using the crosshatch peel test and was observed to pass both primary (dry) and secondary (wet) testing.

A hard coated lens and a control lens, which was prepared in the same manner as the hard coated test lens, but which did not have the acrylate-based film layer, was tested using the steel wool scratch test and the Bayer abrasion test. The haze gain for the test lens using the steel wool scratch test was approximately 0.3 and approximately 2.4 for the control lens. In the Bayer abrasion test, the test lens had a Bayer ratio of approximately 1.7, while the control lens had a Bayer ratio of approximately 1.2. This data shows that the acrylate-based film layer improved the scratch resistance of the lens.

Using the same procedure as described in Example 1, test lenses were tested by tumbling them in a tumbler device containing scouring media (Tumble Mix from Colts Laboratories, Pinellas Park, Fla.) for 20 minutes to induce scratches on the surface of the lenses (Tumble/IPA test.) The test lens exhibited no swelling (a rating of 1), whereas the control lens showed severe swelling (a rating of 4).

As a measure of anti-reflective (AR) coating compatibility, hard coated sample lenses (and a control lens having no AB film beneath the hard coat) were AR coated with Reflection Free coating by Essilor of America. These lenses were tested for the temperature at which the AR coating crazes by the oven soak test described in Example 1. Sample lenses having the AB film crazed at 80° C., while control lenses crazed at 60° C. This data shows that use of the AB film substantially increased the crazing temperature of the lens.

EXAMPLE 3

In the following example, 70 mm semi-finished plastic lenses prepared from an optical quality organic polymeric substrate were used. The test lenses were washed with soapy water, rinsed with clear water and then sprayed with isopropyl alcohol and dried. Test lenses were plasma treated for one minute using a Plasmatech machine at a power setting of 100 Watts, while introducing oxygen at a rate of 100 ml/min into the vacuum chamber of the Plasmatech machine. A photochromic polyurethane coating (of the type described in U.S. Pat. No. 6,187,444 B1) was applied to the plasma treated lenses and thermally cured. The photochromic polyurethane coating was approximately 20 microns thick. The coated test lenses were then washed and dried, and the photochromic coating plasma treated for 5 minutes using the Plasmatech machine at a power setting of 400 Watts, while introducing oxygen at a rate of 200 ml/min into the vacuum chamber of the Plasmatech machine. Three acrylate-based formulations were prepared from the components reported in Table 3 and each formulation applied to the surface of separate test lenses by spin coating. The coatings were cured in a nitrogen atmosphere with UV light from a V bulb. The resulting AB film coatings were approximately 5 microns thick.

TABLE 3

| | Formulation | | |
|---|---|---|---|
| Component/ | A % | B % | C % |
| SR-206 (j) | 9.95 | 29.85 | 24.88 |
| SR-348 (f) | 29.85 | — | — |
| BPA-DOH-DMA (k) | — | 29.85 | 24.88 |
| TPO (l) | 0.12 | 0.18 | 0.15 |
| BAPO (i) | 0.08 | 0.12 | 0.10 |
| UVR-6110 (m) | 43.65 | 26.40 | 26.40 |
| CD-1011 (c) | 1.35 | 3.60 | 3.60 |
| A-174 (n) | 7.50 | 10.00 | 10.00 |
| HEMA (o) | 7.50 | — | 10.00 |

(j) Ethylene Glycol Dimethacrylate (Sartomer)
(k) Bisphenol A Glycerolate (1 glycerol/1 phenol) dimethacrylate (Aldrich)
(l) Diphenyl (2,4,6-trimethylbenzoyl)phosphine oxide (Aldrich)
(m) 3,4-Epoxycyclohexylmethyl-3,4-epoxycyclohexane carboxylate (Dow)
(n) 3-(Trimethoxysilyl)propyl methacrylate (Aldrich)
(o) Hydroxyethyl methacrylate (Aldrich)

AB film coated test lenses were exposed to UV light and observed to reversibly change color. The abrasion and caustic resistance of the AB films were tested by the following described methods. For caustic resistance, the initial haze of the test lens was measured using a BYK Gardner Haze Instrument. The test lens was then immersed in a 60° C. aqueous solution of 12% sodium hydroxide (NaOH) for 5 minutes. The test lens was observed carefully to see if the AB film delaminated from the lens. Afterwards, the haze (final) of the test lens was re-measured and the difference in haze measurements (haze final minus haze initial) recorded. This method is referred to herein as the Delta Haze Test. Delta haze values for the AB films for Formulations A, B, and C in Table 3 were 0.00, 0.43 and 0.19 respectively. Delta haze values less than 2, preferably less than 1, demonstrate that the AB films are resistant to removal by caustic, e.g., sodium hydroxide. The foregoing delta haze values for AB films prepared from Formulations A, B, and C show that such AB films are resistant to removal by aqueous inorganic caustic solution. The abrasion resistance (scratch resistance) of the AB films was tested using the Bayer abrasion test. Results of the Bayer abrasion test are tabulated in Table 4.

Several of each of the AB film coated test lenses were heated for 3 hours at 100° C. and the adhesion of the AB films was tested using the crosshatch peel test. Results are tabulated in Table 4.

Other AB film coated test lenses were plasma treated for 1 minute using the Plasmatech machine at a power setting of 100 Watts, while introducing oxygen at a rate of 100 ml/min into the vacuum chamber of the Plasmatech machine, and a siloxane-based hard coat (HC) was applied to the surface of the lenses by spin coating. Afterwards, the lenses were heated at 60° C. for 20 minutes and then at 100° C. for 3 hours. The siloxane-based hard coat had a thickness of approximately 2 microns. The hard coated lenses were tested for adhesion of the hard coat using the crosshatch peel test and also tested for swelling (crazing) using the Tumble/IPA test described in Example 1. Results are tabulated in Table 4.

EXAMPLE 4

In the following example, 70 mm semi-finished plastic lenses prepared from diethylene glycol bis(allyl carbonate) were used. The test lenses were washed with soapy water, rinsed with clear water and then sprayed with isopropyl alcohol and dried. A surface of the test lenses was treated with an aqueous solution of 12 weight percent sodium hydroxide for 2 minutes, and then rinsed with clear water. A very thin primer layer, e.g., of monomolecular thickness, prepared from the primer composition described in Example 1 was applied to the treated surface in the manner described in Example 1 and cured with UV light. A 20 micron photochromic methacrylic coating of the type described in Example 1 was applied to the primer layer by spin coating and cured by exposure to UV light from a V bulb in a nitrogen atmosphere. The methacrylic photochromic coating was plasma treated for 5 minutes using the Plasmatech machine at a power setting of 400 Watts while introducing oxygen at a rate of 200 ml/min into the vacuum chamber of the Plasmatech machine. An acrylate-based formulation comprising SR-206 (22.39%); BPA-DOH-DMA (22.39%); TPO (0.13%); BAPO (0.09%); UVR-6110 (30.80%); CD-1011 (4.20%); A-174 (10.00%); and HEMA (10.00%) [See Table 3 for abbreviation definitions] was prepared and applied to the plasma treated surface of the lenses. The resultant AB film was cured by exposure to UV light from a V bulb in a nitrogen atmosphere and was approximately 5 microns thick.

AB film coated test lenses were exposed to UV light and observed to reversibly change color. The caustic resistance of the AB film was tested using the delta haze test. The delta haze value was 0.31, which demonstrated the AB film's resistance to removal by inorganic caustic. The abrasion resistance of the AB film was tested using the Bayer abrasion test. The result is reported in Table 4 in the line for test lens D.

AB film coated test lens was heated for 3 hours at 100° C., and the adhesion property of such lens tested using the crosshatch peel test. The result is reported in Table 4 in the line for test lens D.

Other AB film coated test lenses were plasma treated for 1 minute using the Plasmatech machine at a power setting of 100 Watts while introducing oxygen at a rate of 100 ml/min into the vacuum chamber of the Plasmatech machine, and a siloxane-based hard coat was applied to the plasma treated surface of the lenses by spin coating. Afterwards, the lenses were heated at 60° C. for 20 minutes and then at 100° C. for 3 hours. The siloxane-based hard coat had a thickness of approximately 2 microns. A hard coated lens was tested for adhesion using the crosshatch peel test, and another hard coated lens tested for swelling using the Tumble/IPA test described above. The results are reported in Table 4 in the line for test lens D.

TABLE 4

| Test Lens | Adhesion Dry/Wet (% Loss) AB Film | Bayer Abrasion | Adhesion Dry/Wet (% Loss) Hardcoat | Tumble/IPA Swell Test |
|---|---|---|---|---|
| A | 0/0 | 0.66 | 0/0 | 1 |
| B | 0/0 | 0.85 | 25/0 | 1 |
| C | 0/0 | 0.95 | 0/0 | 1 |
| D | 0/0 | 0.74 | 0/0 | 1 |

The data reported in Table 4 show that all of the test lenses were scratch resistant (having Bayer abrasion values of greater than 0.5), that the AB films cohesively adhered to the photochromic coating to which the AB film was applied, that the siloxane-based hard coat also adhered to the AB film, and that the hard coat did not exhibit any swelling as a result of the Tumble/IPA test.

EXAMPLE 5

In the following example, 70 mm plano, finished single vision lenses prepared from diethylene glycol bis(allyl carbonate) were used. The lenses were obtained from SOLA Optical USA. The lenses were washed with an aqueous detergent solution, rinsed first with water, and then rinsed with deionized water. Thereafter, the lenses were sprayed with isopropyl alcohol and then dried in a warm convection oven. The lenses were plasma treated for 1 minute using a Plasmatech microwave machine at a power setting of 100 Watts, while introducing oxygen at a rate of 100 ml/min and at a gas pressure of 38 Pascals.

A photochromic polyurethane formulation of the type described in International Patent Publication WO 01/55269 was prepared. The polyurethane formulation comprised an aliphatic polycarbonate diol (PC 1122) available from Stahl USA, which is reported to be polyhexamethylene dicarbonate, an acrylic polyol, a methyl ethyl ketoxime blocked aliphatic polyisocyanates (Vestanat B 1358A) available from CreaNova, Inc, a mixture of naphtho[1,2-b]pyran photochromic compounds, dibutyl tin dilaurate catalyst, a hindered amine light stabilizer (Tinuvin 144) available from Ciba-Geigy Corp, γ-glycidoxypropyl trimethoxysilane (Silquest A-187) available from OSi Specialty Chemicals, BAYSILONE paint additive PL (phenyl methyl polysiloxane available from Bayer Corporation, and N-methyl pyrrolidone solvent. The photochromic formulation was applied to the surface of each lens by spin coating. The wet film weight of the coating on each lens was approximately 200 milligrams. The coated lenses were placed in a 140° C. convection oven for 75 minutes to cure the coatings. The final thickness of the cured photochromic polyurethane coatings was approximately 20 microns.

A series of ten acrylic-based film (AB film) formulations were prepared by mixing the components found in Table 5 with 1 weight percent TPO initiator [diphenyl (2,4,6-trimethylbenzoyl) phosphine oxide] in scintillated glass vials, and gently heating the mixture of components in a 60° C. convection oven until the initiator was completely dissolved. The AB film formulations of Table 5 were prepared on a 10 gram scale at 100% solids.

TABLE 5

AB FILM FORMULATIONS

| Component/ | 1 | 2 | 3 | 4 | 5 | 6 | 7 | 8 | 9 | 10 |
|---|---|---|---|---|---|---|---|---|---|---|
| HEMA (o) | 4.6 | 3.2 | 4.5 | 1.4 | 4.3 | 3.8 | 5.7 | 4.3 | 4.7 | 4.3 |
| SR-206 (j) | 1.5 | 2.2 | 2.2 | 6.0 | — | 0.5 | — | 2.2 | 0.1 | — |
| HEA (p) | 0.1 | 2.2 | 3.1 | 2.5 | — | — | 1.3 | — | 2.0 | — |
| SR-247 (q) | 1.6 | 1.0 | 0.1 | 0.1 | 4.2 | 5.1 | 1.5 | 1.2 | 0.2 | 4.2 |
| TMPTMA (e) | 0.8 | — | — | — | — | 0.6 | 1.5 | 1.5 | 1.5 | 1.5 |
| TMPTA (r) | 1.5 | 1.5 | — | — | 1.5 | — | — | 0.8 | 1.5 | — |

(j) Ethylene Glycol Dimethacrylate (Aldrich)
(p) Hydroxyethylacrylate (Aldrich)
(q) Neopentyl Glycol Diacrylate
(r) Trimethylolpropane Triacrylate The photochromic polyurethane coated lenses were treated with a Plasmatech microwave gas plasma unit for 5 minutes at a power setting of 400 Watts, while introducing oxygen into the vacuum chamber of the Plasmatech unit at a flow rate of 200 ml/minute and a gas pressure of 64 Pascals. Approximately 1 ml of each of the AB film formulations of Table 5 was applied to the center of separate plasma treated photochromic polyurethane coated lenses by spin coating. The spin rate and elapsed spin time were adjusted (due to the varying viscosities of the film formulation) in order to obtain a wet film weight of approximately 0.025 grams. The AB film coated lenses were cured by UV exposure for approximately 40 seconds in an EYE UV line containing two V bulbs (gallium iodide). The AB film coated lenses were exposed to ultraviolet light and were observed to reversibly change color. A lens coated with formulation #10 was tested for Bayer abrasion with a resultant rating of 1.06, which shows improved scratch resistance.

AB film coated lenses prepared from each of the AB film formulations found in Table 5 were tested for adhesion using the crosshatch tape peel adhesion test described earlier. Results of the adhesion testing are tabulated in Table 6. In Table 6, adhesion is reported for both the primary (1°) and the secondary (2°) test. As noted earlier, the secondary test is the crosshatch tape peel test that is performed after soaking the lenses in boiling deionized water for 30 minutes. Sample lenses coated with formulation #10 were run through a hard coating line wherein the lenses were exposed to an aqueous solution of 35% KOH for 33 seconds, and no degradation of the AB film was observed.

AB film coated test lenses were plasma treated for 5 minutes using a Plasmatech microwave machine at a power level of 400 Watts while oxygen gas was introduced at a rate of 200 ml/minute into the vacuum chamber of the Plasmatech machine at a gas pressure of 64 Pascals. Two test lenses selected from each of the plasma treated AB film formulations were coated with an organo silane-containing hard coating solution (Hi-Gard® 1030 available from PPG Industries, Inc.) by spin coating. Approximately 4 ml of the hard coating solution was dispensed onto the surface of the AB film as the lens was spinning. Afterwards, the lenses were heated at 60° C. for 20 minutes and then at 120° C. for 3 hours. The final thickness of the dried hard coating was approximately 2 microns. The hard coated test lenses were also subjected to the primary and secondary crosshatch tape peel test. Results of adhesion testing of the hard coat to the AB film are also reported in Table 6. In addition, other hard coated test lenses were inspected for crazing of the hard coat after their immersion in boiling deionized water prior to the secondary crosshatch tape peel test. Results are also tabulated in Table 6.

Using the same procedure as described in Example 1, test lenses coated with formulation #10 were tested by tumbling them in a tumbler device containing scouring media (Tumble Mix from Colts Laboratories, Pinellas Park, Fla.) for 20 minutes to induce scratches on the surface of the lenses (Tumble/IPA test). The test lenses exhibited no swelling (a rating of 1); whereas a control lens showed severe swelling (a rating of 4).

TABLE 6

ADHESION TESTING

| Formulation/ | (% Loss) AB Film | | (% Loss) Hardcoat | | Crazing |
|---|---|---|---|---|---|
| | 1° | 2° | 1° | 2° | |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 0 |

The data of Table 6 shows that when each of the 10 formulations shown in Table 5 were used as an AB film on a photochromic polyurethane coating applied to a lens, the AB film cohesively bonded to the photochromic polyurethane coating, and the organo silane-containing hard coat applied to the AB film also cohesively bonded to the AB film. Further, no crazing of the hard coating was observed after being immersed in boiling deionized water for 30 minutes.

EXAMPLE 6

In the following example, 70 mm semi-finished PDQ hard coated polycarbonate lenses obtained from Gentex Optics were used. The test lenses were washed with soapy water, rinsed with clear water, sprayed with isopropyl alcohol and dried. Test lenses were plasma treated for one minute using a Plasmatech machine at a power setting of 100 Watts, while introducing oxygen at a rate of 100 ml/min into the vacuum chamber of the Plasmatech machine. A photochromic polyurethane coating (of the type described in U.S. Pat. No. 6,187,444 B1) was applied to the plasma treated lenses and thermally cured. The photochromic polyurethane coating was approximately 20 microns thick. The photochromic polyurethane coating on the test lenses were plasma treated for 1 minute at 100 Watts while introducing oxygen at a rate of 40 ml/minute in the vacuum chamber of the Plasmatech machine. Four acrylate-based formulations were prepared from the components reported in Table 7 and each formulation applied to the surface of separate sample lenses by spin coating. The resulting films were approximately 5 microns thick. The coatings were cured with UV light from a V bulb in the presence of nitrogen.

TABLE 7

| Component/ | Formulation | | | |
|---|---|---|---|---|
| | A % | B % | C % | D % |
| BPA-DOH-DMA (k) | 32.56 | 26.31 | — | — |
| SR-206 (j) | 32.56 | 26.31 | — | — |
| SR-247 (q) | — | — | 33.50 | 33.50 |
| SR-350 (e) | — | — | 11.96 | 11.96 |
| UVR-6110 (m) | 11.2 | 9.31 | — | — |
| NB# 828150 (s) | 12.63 | 31.48 | — | 19.98 |
| Desmodur PL 340 (t) | — | — | 19.98 | — |
| HEMA (o) | 4.55 | 4.81 | 34.30 | 34.30 |
| A-174 (n) | 4.55 | — | — | — |
| DBTDL (u) | 0.10 | 0.25 | 0.10 | 0.10 |
| TPO (l) | 0.20 | 0.16 | 0.08 | 0.08 |
| BAPO (i) | 0.13 | 0.11 | 0.08 | 0.08 |
| CD-1011 (c) | 1.53 | 1.27 | — | — |

(s) Blocked polyisocyanate product based on HDI (hexamethylene diisocyanate), which is reported to contain a mono-functional methacrylate group (Obtained from Bayer Corp under the product code XD-045323).
(t) Blocked IPDI (isophorone diisocyanate obtained from Bayer Corp).
(u) Dibutyl tin dilaurate.

AB film coated test lenses were exposed to UV light and observed to reversibly change color. The caustic resistance of such AB films were tested using the delta haze test. Delta haze values for the AB films prepared from formulations A, B, C and D in Table 7 were 0.29, 0.26, 0.07 and 0.43 respectively, which demonstrates that the AB films were resistant to removal by aqueous inorganic caustic solutions. AB films on the test lenses that were prepared from formulations A, B, C, and D in Table 7 were also tested for scratch resistance using the Bayer abrasion test. Results are tabulated in Table 8, which data shows that the AB films are scratch resistant.

AB film coated test lenses were heated in a 100° C. oven for 3 hours, and these lenses were tested for adhesion using the crosshatch peel test. Results are tabulated in Table 8.

The AB film on AB film coated test lenses was plasma treated for 1 minute using a Plasmatech machine at a power setting of 100 Watts while introducing oxygen at a rate 100 ml/min into the vacuum chamber of the Plasmatech machine, and a siloxane-based hard coat applied over the AB film. Afterwards, the lenses were heated at 60° C. for 20 minutes and then at 100° C. for 3 hours. The siloxane-based hard coat had a thickness of approximately 2 microns. The hard coated test lenses were tested for adhesion of the acrylate film using the crosshatch peel test, and for swelling using the Tumble/IPA test. Results are tabulated in Table 8.

TABLE 8

| Test Lens | Adhesion Dry/Wet (% Loss) AB Film | Bayer Abrasion | Adhesion Dry/Wet (% Loss) Hardcoat | Tumble/IPA Swell Test |
|---|---|---|---|---|
| A | 0/0 | 0.87 | 0/0 | 1 |
| B | 0/0 | 0.84 | 0/0 | 1 |
| C | 0/0 | 1.01 | 0/0 | 1 |
| D | 0/0 | 1.37 | 0/0 | 1 |

The data of Table 8 show that when each of the four formulations shown in Table 7 were used as an AB film on a photochromic polyurethane coating applied to a lens, the AB film cohesively bonded to the photochromic polyurethane coating, and the siloxane-based hard coat applied to the AB film also cohesively bonded to the AB film. Further, no swelling of the hard coat was observed, as shown by the Tumble/IPA test.

Although the present invention has been described with reference to specific details of certain embodiments thereof, it is not intended that such details should be regarded as limitations upon the scope of the invention except insofar as they are included in the accompanying claims.

What is claimed is:

1. photochromic article comprising, in combination: (a) an organic polymeric substrate, (b) a photochromic organic polymeric coating appended to at least one surface of the polymeric substrate, said polymeric coating comprising a photochromic amount of at least one organic photochromic material and having a Fischer microhardness ranging from 15 to 80 Newtons per $mm^2$, (c) a radiation-cured, acrylate-based film coherently superimposed on the photochromic polymeric coating, said radiation-cured acrylate-based film being prepared from a polymerizable composition comprising more than 50 weight percent of acrylic functional monomers, and (d) an abrasion resistant coating coherently superimposed on the radiation-cured, acrylate-based film; wherein the radiation-cured, acrylate-based film of (c) is harder than the photochromic organic polymeric coating of (b), the abrasion resistant coating of (d) is harder than the radiation-cured, acrylate-based film of (c), and the radiation-cured, acrylate-based film of (c) is resistant to removal by aqueous inorganic caustic.

2. The photochromic article of claim 1 wherein the polymeric substrate is selected from thermoset and thermoplastic materials having a refractive index of from 1.48 to 1.74.

3. The photochromic article of claim 2 wherein the polymeric substrate is a substrate selected from thermoset substrates prepared from polymerizable compositions comprising allyl diglycol carbonate monomer(s), substrates prepared from thermoplastic polycarbonates, substrates prepared from polyurea urethanes and substrates prepared from compositions comprising the reaction product of polyfunctional isocyanate(s) and polythiol or polyepisulfide monomer(s).

4. The photochromic article of claim 1 wherein the photochromic organic polymeric coating is selected from photochromic polyurethane-based coatings, photochromic poly(meth)acrylic-based coatings, and photochromic epoxy resin-based coatings.

5. The photochromic article of claim 1 wherein the photochromic material is selected from photochromic spirooxazines, benzopyrans, naphthopyrans, fulgides, metal dithizonates and mixtures thereof.

6. The photochromic article of claim 1 wherein the active photochromic material in the photochromic coating is present in an amount of from 0.5 to 40 weight percent.

7. The photochromic article of claim 1 wherein the photochromic coating has a thickness of from 5 to 200 microns.

8. The photochromic article of claim 7 wherein the photochromic coating has a thickness of from 10 to 50 microns.

9. The photochromic article of claim 1 wherein the radiation-cured acrylate-based film has a thickness of from 2 to 20 microns.

10. The photochromic article of claim 1 wherein the average haze gain of the radiation-cured acrylate-based film is less than 40, as measured by the steel wool scratch test.

11. The photochromic article of claim 1 wherein the radiation-cured acrylate-based film is prepared from a polymerizable composition comprising from 0 to 75 weight percent of monofunctional acrylates and from 3 to 60 weight percent of difunctional acrylates.

12. The photochromic article of claim 11 wherein the polymerizable composition further comprises from 5 to 30 weight percent trifunctional acrylates.

13. The photochromic article of claim 11 wherein the polymerizable composition further comprises a component having at least one isocyanate functionality.

14. The photochromic article of claim 13 wherein the component having at least one isocyanate functionality comprises blocked isophorone diisocyanate and/or a blocked polyisocyanate based on hexamethylene diisocyanate.

15. The photochromic article of claim 1 wherein the abrasion resistant coating comprises an organo sitane-based coating.

16. The photochromic article of claim 1 wherein the average haze gain of the abrasion resistant coating is less than 5, as measured by the steel wool scratch test.

17. The photochromic article of claim 1 wherein the abrasion resistant coating has a thickness of from 0.5 to 10 microns.

18. The photochromic article of claim 1 wherein the thickness of the acrylic-based film is reduced by less than 0.5 microns after two exposures to 12.5 weight percent aqueous potassium hydroxide at 60° C., each exposure being for four minutes.

19. The photochromic article of claim 1 further comprising at least one antireflective coating affixed to the surface of the abrasion resistant coating.

20. The photochromic article of claim 1 wherein a primer coating is interposed between the organic polymeric substrate and the photochromic organic polymeric coating.

21. The photochromic article of claim 1 wherein the article is an ophthalmic article.

22. The photochromic article of claim 1 wherein the radiation-cured, acrylate-based film (c) is prepared from a polymerizable composition comprising more than 50 weight percent of acrylic functional monomers, wherein said composition is such that the radiation-cured, acrylate-based film has a Bayer haze gain ratio of greater than 0.6.

23. The photochromic article of claim 22 wherein the increase in bleach half-life and the decrease in saturated optical density of the photochromic article comprising the radiation-cured, acrylate-based film (c) does not change more than 20% of the bleach half-life and the saturated optical density of a similar photochromic article that does not comprise the radiation-cured, acrylate-based film (c).

* * * * *